United States Patent [19]

Ghanem

[11] 4,035,778
[45] July 12, 1977

[54] APPARATUS FOR ASSIGNING SPACE IN A WORKING MEMORY AS A FUNCTION OF THE HISTORY OF USAGE

[75] Inventor: Mohamed Zein El-Aeiden Ghanem, Ossining, N.Y.

[73] Assignee: International Business Machines Corporation, Armonk, N.Y.

[21] Appl. No.: 632,411

[22] Filed: Nov. 17, 1975

[51] Int. Cl.$^2$ .................................... G11C 9/06
[52] U.S. Cl. ............................................. 364/200
[58] Field of Search ................... 340/172.5; 444/1

[56] References Cited

U.S. PATENT DOCUMENTS

| | | | |
|---|---|---|---|
| 3,217,298 | 11/1965 | Kilburn et al. | 340/172.5 |
| 3,277,447 | 10/1966 | Newman et al. | 340/172.5 |
| 3,422,401 | 1/1969 | Lucking | 340/172.5 |
| 3,541,529 | 11/1970 | Nelson | 340/172.5 |
| 3,624,616 | 11/1971 | Patel | 340/172.5 |
| 3,670,307 | 6/1972 | Arnold et al. | 340/172.5 |
| 3,675,215 | 7/1972 | Arnold et al. | 340/172.5 |
| 3,699,533 | 10/1972 | Hunter | 340/172.5 |
| 3,840,863 | 10/1974 | Fuqua et al. | 340/172.5 |
| 3,958,228 | 5/1976 | Coombes et al. | 340/172.5 |
| Re. 26,624 | 7/1969 | Bloom et al. | 340/172.5 |

*Primary Examiner*—Melvin B. Chapnick
*Attorney, Agent, or Firm*—Robert E. Sandt

[57] ABSTRACT

Apparatus for controlling the division of working memory space among $n$ competitive programs with different characteristics, running in a multiprogramming and virtual memory environment, in which the allocation of working space is optimized by adjusting the size of the working set for each competing program. Under this optimization scheme, "the value of a page frame" (the amount of reduction in the page fault rate if an additional page frame is allocated to that program) is sought to be equalized for all programs. Every memory access increments an access counter. When it reaches its maximum count of 1024, the reference register value stored in an associative memory for each page is incremented by one count, except that for the page accessed it is reset to zero. The stored numbers range from 0 to 31. Whenever a page fault occurs, the number of pages of that program having a reference register count equal to each of the numbers 0 to 31 is temporarily stored as a table of 32 W$d$ values. The differences of successive pairs of these values are computed and stored as W$dd$ values. The quotients of a $wdd$ and a corresponding $wd$ value are computed and permanently stored as a table of 31 $k$ values for the faulting program. Memory is then accessed for a Tau value for the faulting program computed and stored from a prior update operation. This value, from 1 to 31, addresses the corresponding ordinal entry in the just-computed $k$ array to provide a $k^{new}$ for the faulting program. This $k^{new}$ and a stored $k^{old}$ together with a $K^{OLD}$, the stored overall weighting norm, is substituted in the formula $$K^{NEW} = K^{OLD} + (K^{new} - k^{old}/n)$$

to produce one updated weighting norm $n$ being the number of working programs. The updated K and $k$ values are stored. The stored Tau value for each program then addresses the corresponding $k$ array to test the $k$ in the Tauth column for equality, plus or minus a small constant $\epsilon$. Each page having a reference register value greater than the just-updated Tau value for that program to which the page is a part is marked for replacement. Pages marked for replacement are replaced in turn.

4 Claims, 32 Drawing Figures

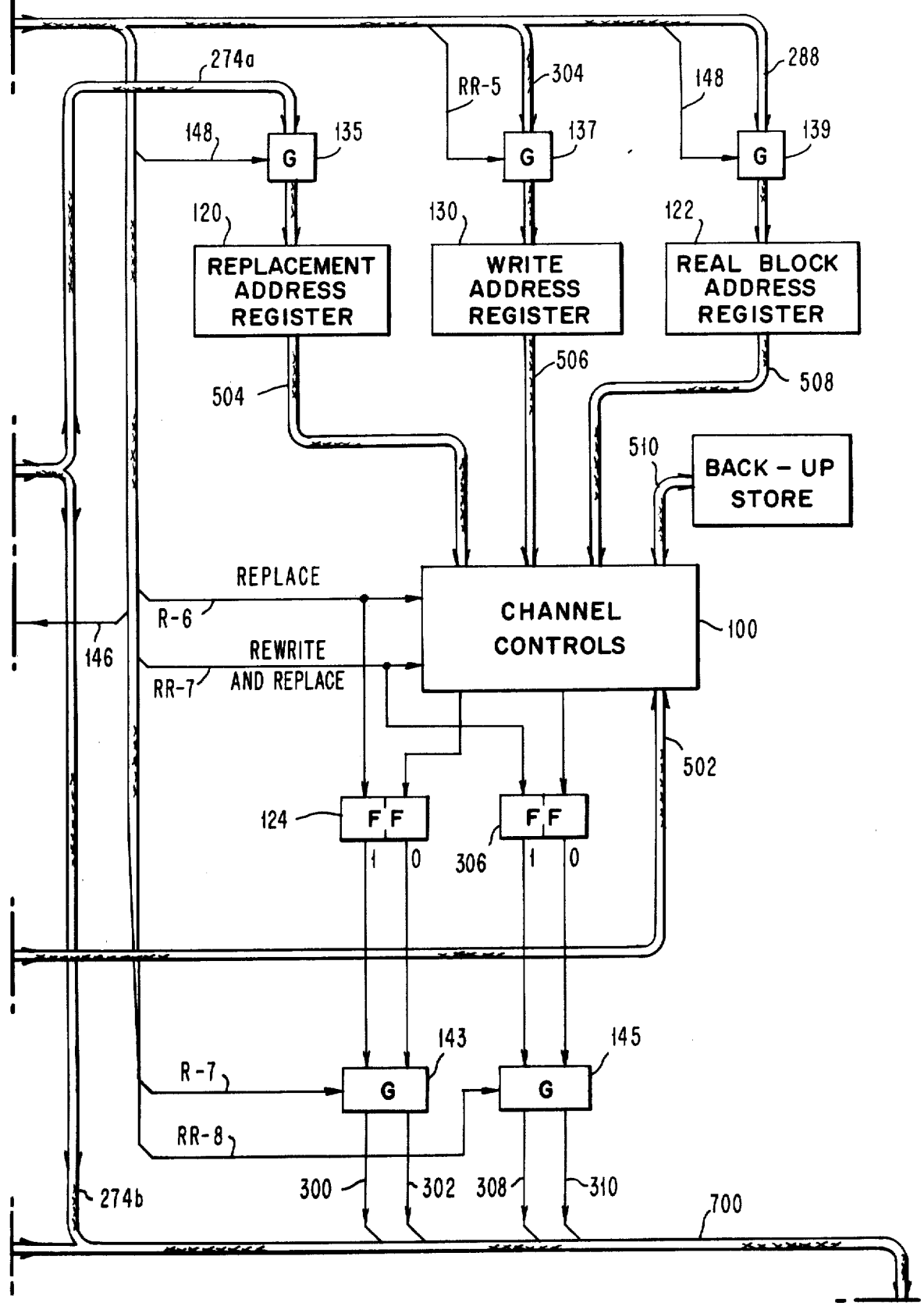

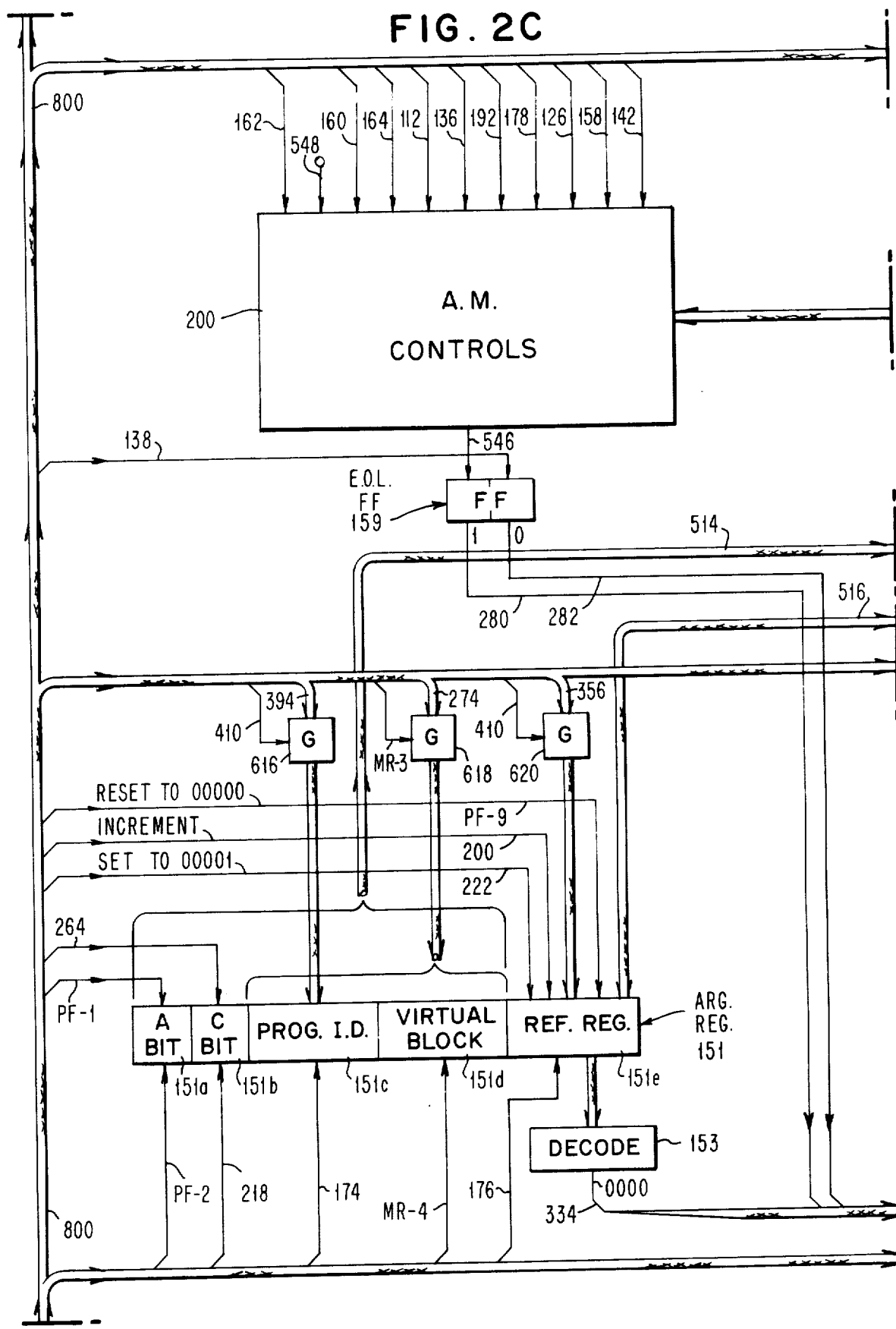

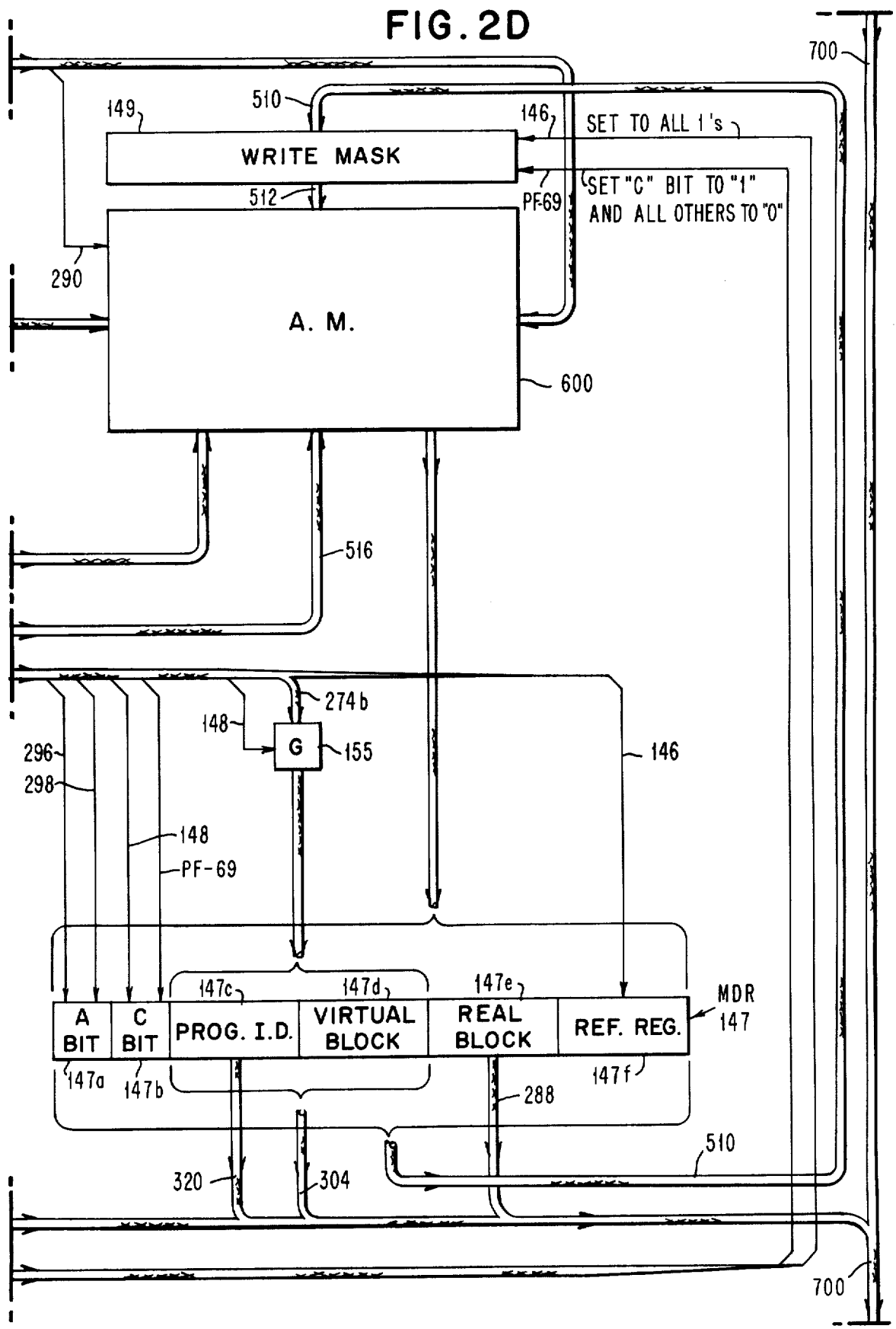

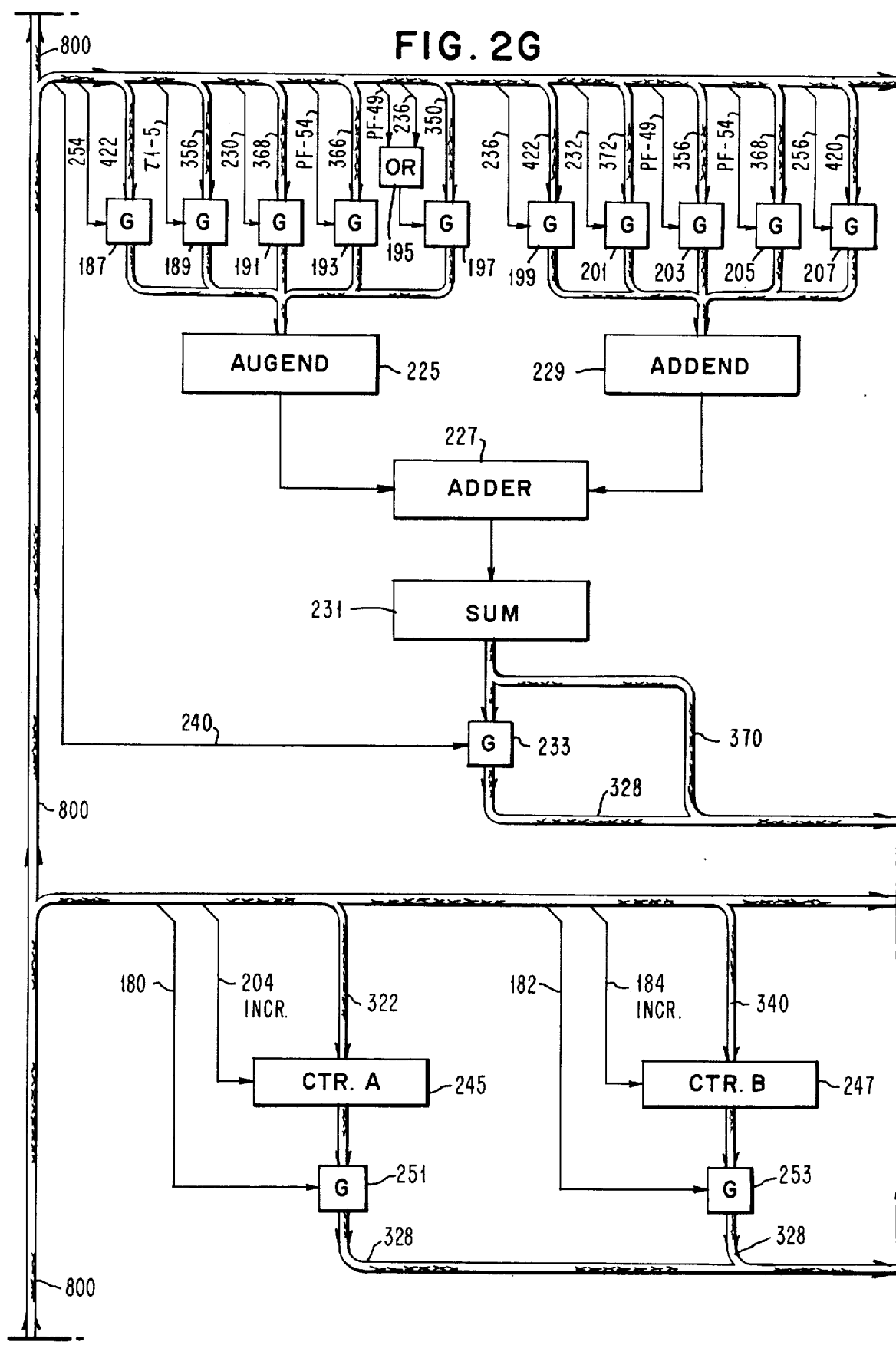

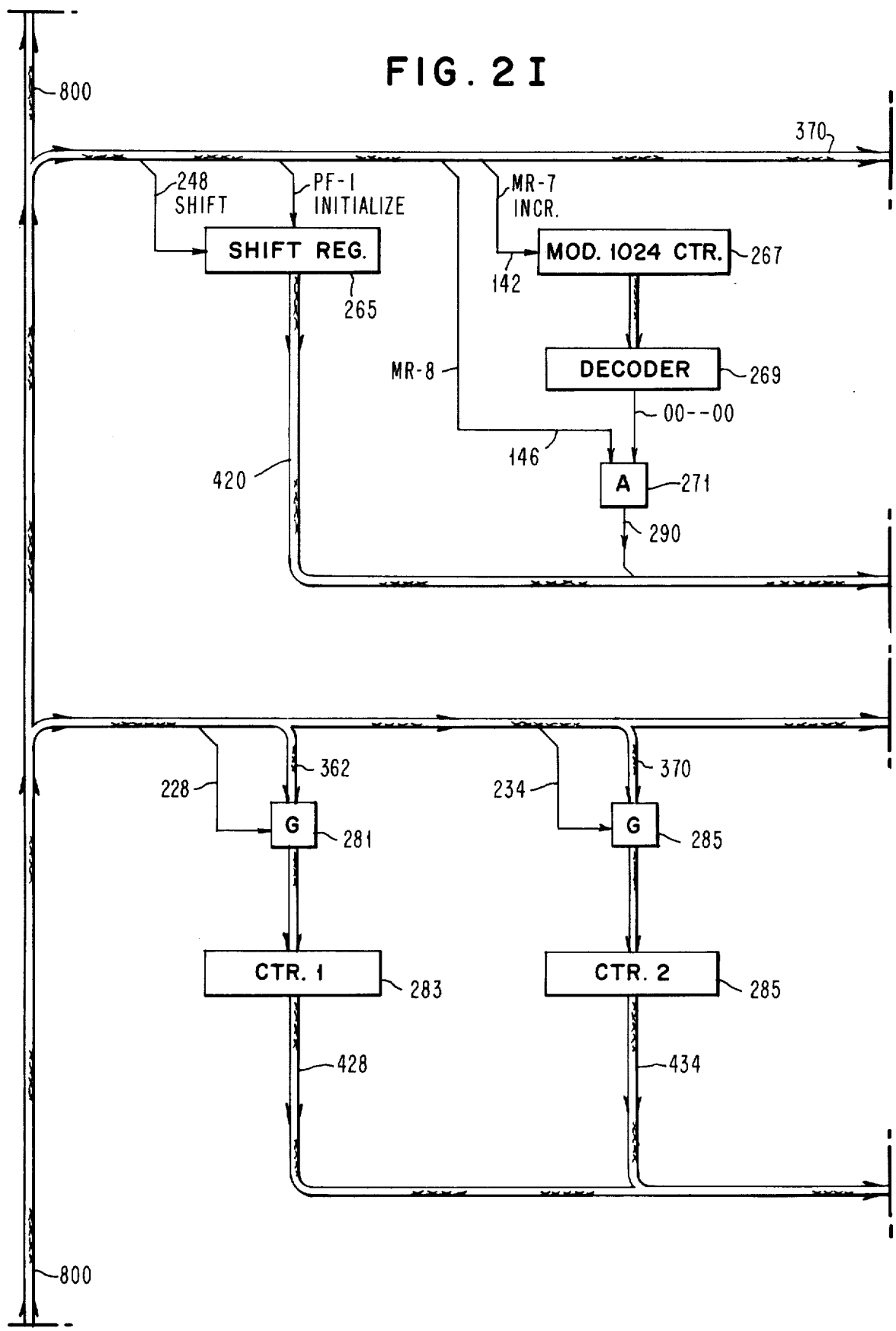

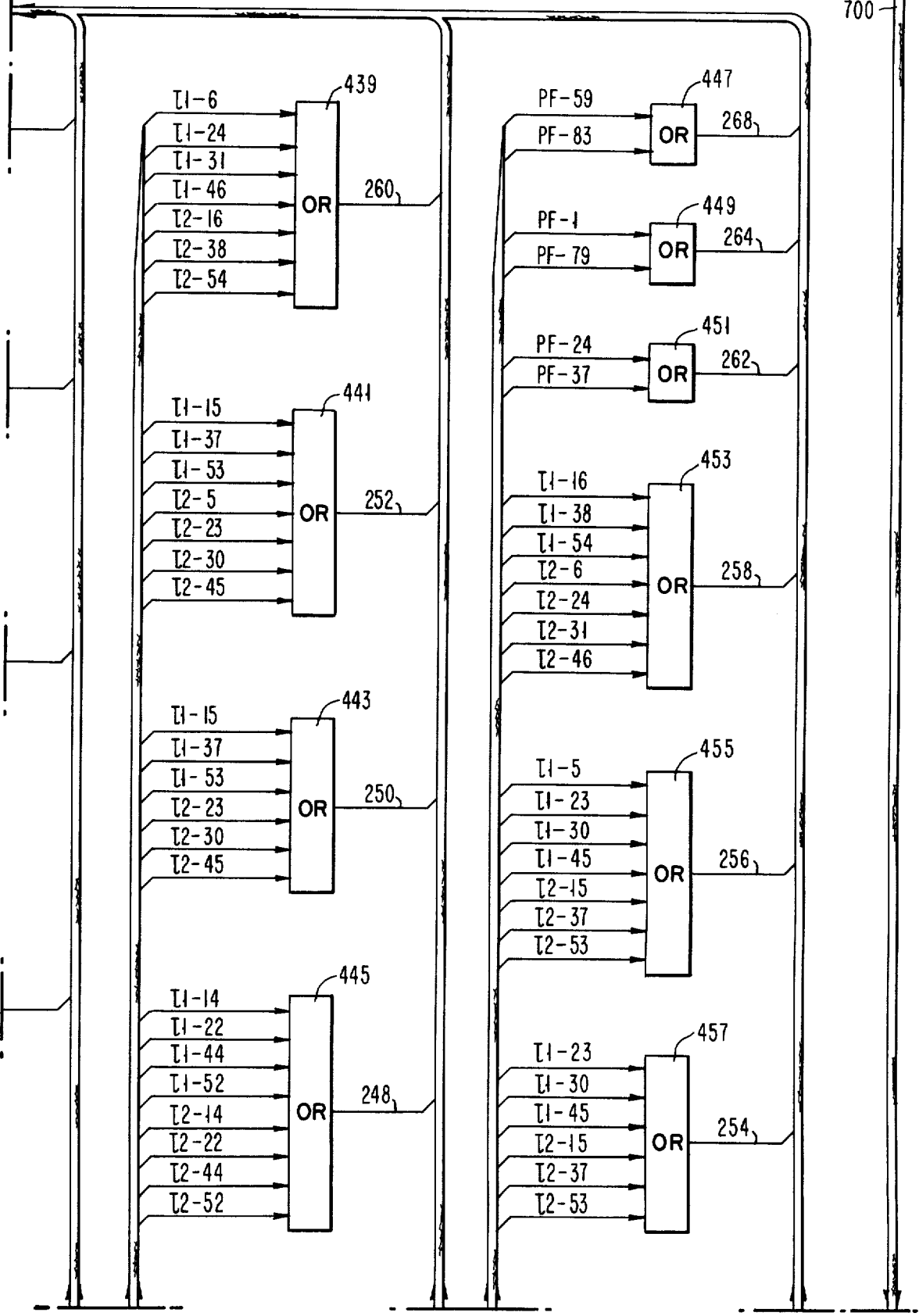

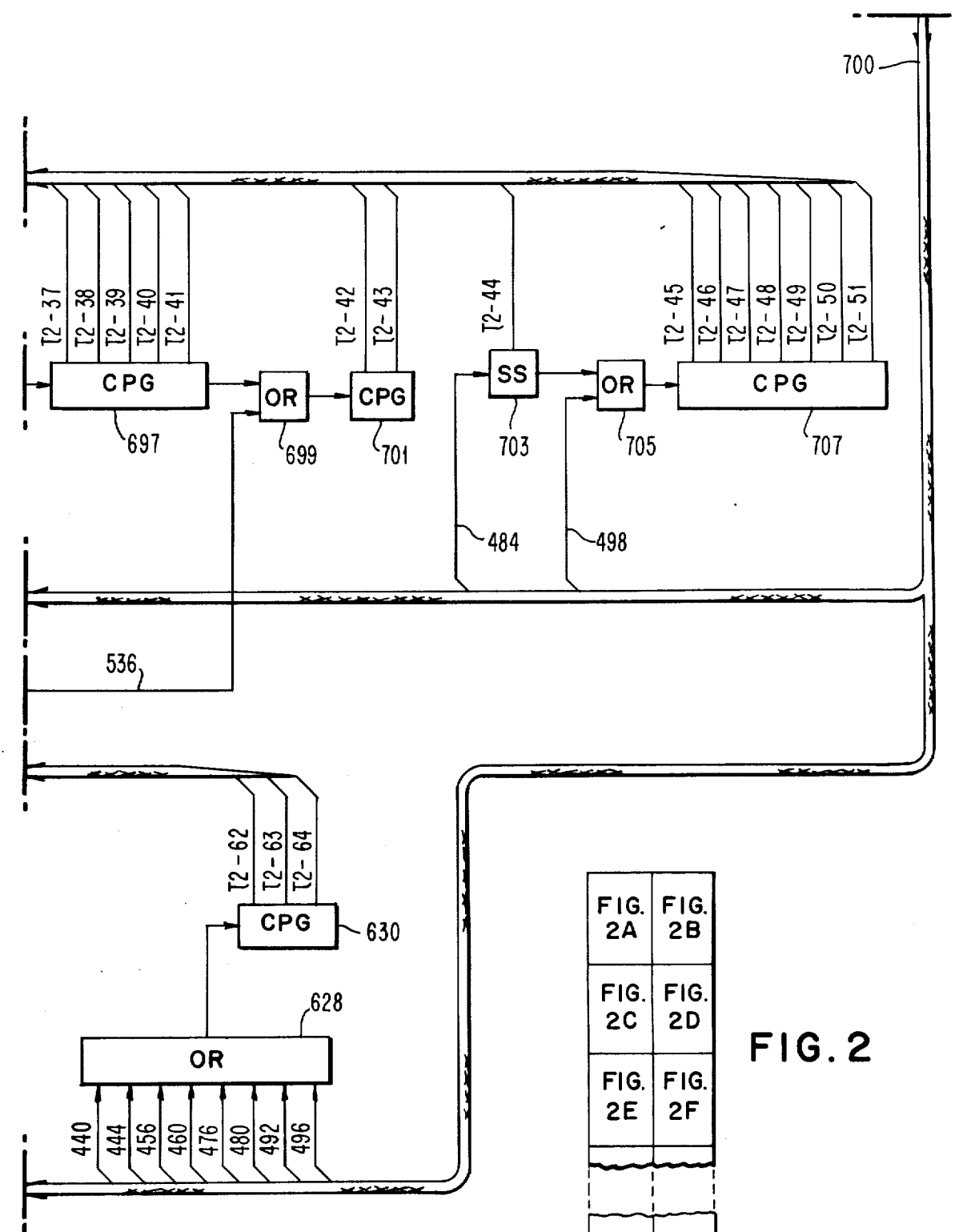

AM CONTROLS

SAM CONTROLS

APPARATUS FOR ASSIGNING SPACE IN A WORKING MEMORY AS A FUNCTION OF THE HISTORY OF USAGE

BACKGROUND OF THE INVENTION

This invention relates to memory systems, and more particularly to a system for controlling the storage of information in a memory as a function of the anticipated need for future access thereto.

Discussion of the Prior Art

It is common practice in the computer art to store the more frequently needed data in a low capacity, high speed, working memory and the less frequently used data in various echelons of backup storage, each larger and slower than the next higher level. At the lowest level of storage, there might be a magnetic tape on a shelf which must be manually mounted on a machine before its data are available.

In a data processing system operating in the multiprogramming virtual memory mode, the various page frames belonging to the running programs are either stored in the working memory or in the backup store. The central processing unit, when it requires access to a given page, requests it by an identification which is sufficiently definitive to locate it, wherever it might be stored. It is up to the data management controls to utilize this number to locate and make the requested page available to the CPU. Ideally, for optimum system speed, all sought page frames should be in the high speed working memory. However, economic considerations preclude having a high speed working memory of such a size that it can store everything the CPU might demand.

Therefore, another function of a data management system is to attempt to anticipate the future demands of the CPU and to eliminate the "deadwood" from the working memory. If the management is successful, then the failure to find a sought page in working memory (page fault) will be minimized, and the overall speed of the data processing system will be optimized.

Various schemes have been devised for choosing the page frames for residence in the working memory. Broadly speaking, there are two classes of automatic memory management, fixed partitioning and variable partitioning. Both maintain an historical log of past performance and seek to extrapolate that performance by applying a set of rules or an algorithm to the historical statistics to determine which of the residents of the working memory shall be dispossessed when the need for storage space arises.

Fixed partitioning allocates a predetermined amount of storage space in the working memory to each running program. Once determined, it cannot be automatically changed, nor can one program borrow space from another. Each program can only change the page roster within its own assigned space. Fixed memory partitioning, while economical of implementation hardware, is necessarily quite inflexible and derivatively less efficient, in terms of system speed, in a highly volatile multi-processing operating system.

Variable partitioning, on the other hand, allocates space in the working memory in accordance with the predicted need for space. In essence, the pages of one program not only compete with one another for space in the working memory but also with the pages of all other working programs. Thus, at different times in the operating history of a data processing system, a given program will have different quantities of storage space allocated to it, depending on the competing needs of each program.

Several important algorithms for implementing variable partitioning strategies have been proposed in the literature. Examples of these include "global LRU," "global FIFO," "global FINUFO" (first in not used, first out), and the "AC/RT" procedure. "Global LRU" arranges all the pages of the active programs in a single global LRU list. Global FIFO arranges all the pages of the active programs in a single FIFO list. Global FINUFO arranges all the pages of the active programs in a circular list with a positioning pointer. Each page has a usage bit which is set to zero if the page has not been referenced and is set to a one by the hardware whenever the page is referenced. When a page fault occurs, the pointer is advanced around the list until the first page with a zero usage bit is found. The page at which the pointer stops is chosen for replacement.

It is to be noted that while each of the foregoing systems keeps an historical log of the prior usage of the individual pages, the replacement candidate is chosen on the basis of some simple rule, involving no calculation and no comparison of relative weighting values of the respective pages. The variable partitioning is achieved solely because a given program has had little or no recent activity, or other controlling parameter.

In the "AC/RT" algorithm, each program has associated with it two variables AC and RT, whose values are updated at each page fault of that program. The AC (activity count) of a given program manifests the fraction of its allocated space in memory that has been accessed since its last page fault. The RT (round trip frequency) value manifests the fraction of the last K page faults which caused the recall of the most recently replaced page. A high AC value indicates the program is making effective use of its allocated space in memory. A high RT value indicates that many mistakes are being made in the replacement decisions. If the RT value of a given program is low, a page may be stolen from it. If the RT value is high, add a page to that program, stealing space from another program with the lowest AC value.

While all of the foregoing postulate and implement rules for replacing individual pages in a memory such that the working space allocated to any one given program may vary accordance with usage, none seeks to optimize the allocation by computing a norm based on prior usage activity and adjusting the space allocated to each of the competing programs so that each program will approach that norm as a limit, as well as adjusting the page roster of each respective program to mark the least likely to be accessed pages for replacement as a function of their displacement from that norm.

Therefore, it is an object of this invention to provide means for allocating space in a working memory among a plurality of competing classes of information, wherein each class of information consists of a plurality of information segments, by compiling an historical statistical log of the usage of every segment stored in the working memory, computing a weighting norm for one class of information as a function of the usage statistics of the segments in working memory belonging to that class, comparing the weighting norm, adjusting the weighting values of each of said other class to be substantially equal to the weighting norm, comprising all the weighting value for each individual segment with the weighting value for its associated class and marking these segments having the greatest difference in weighting values.

The foregoing and other objects, features, and advantages of the present invention will be apparent from the following more particular description of a preferred embodiment of the invention as illustrated in the accompanying drawings.

BRIEF DESCRIPTION OF THE DRAWINGS

FIG. 3 is a joining diagram for FIGS. 3A and 3B.

GENERAL DESCRIPTION OF OPERATION

Because of the complexity of the logic circuitry, it is preferable to employ a functional flow diagram to summarize the operation of the memory paging systems. This flow diagram is couched in decision logic terms, all of which are implemented by tests activated by the various timing pulses as will hereinafter be described in detail.

Figure 1:
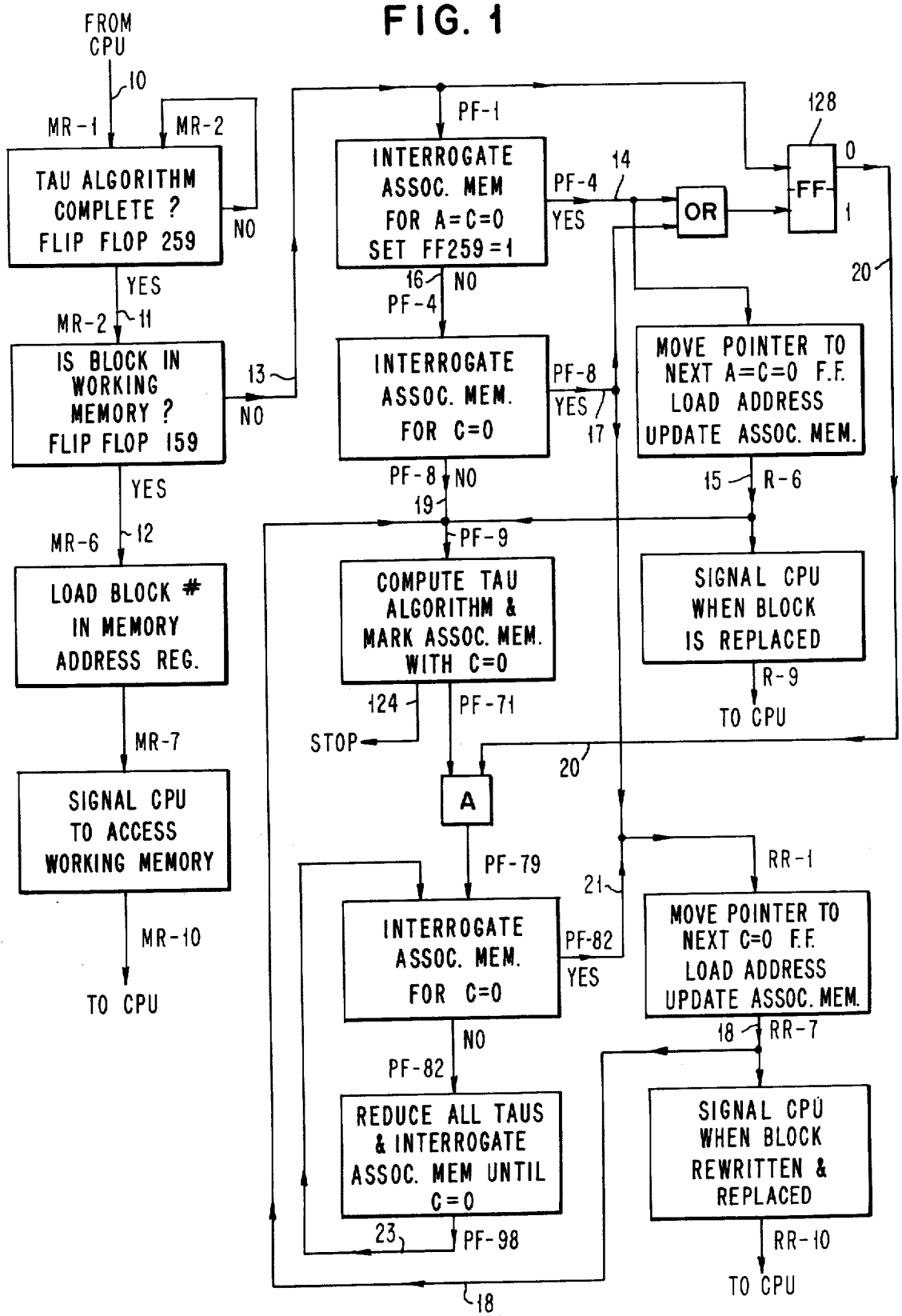
FIG. 1 is a simplified summary flow diagram of the logic functions implemented by the apparatus of FIGS. 2A–2Z.
Figure 2A:
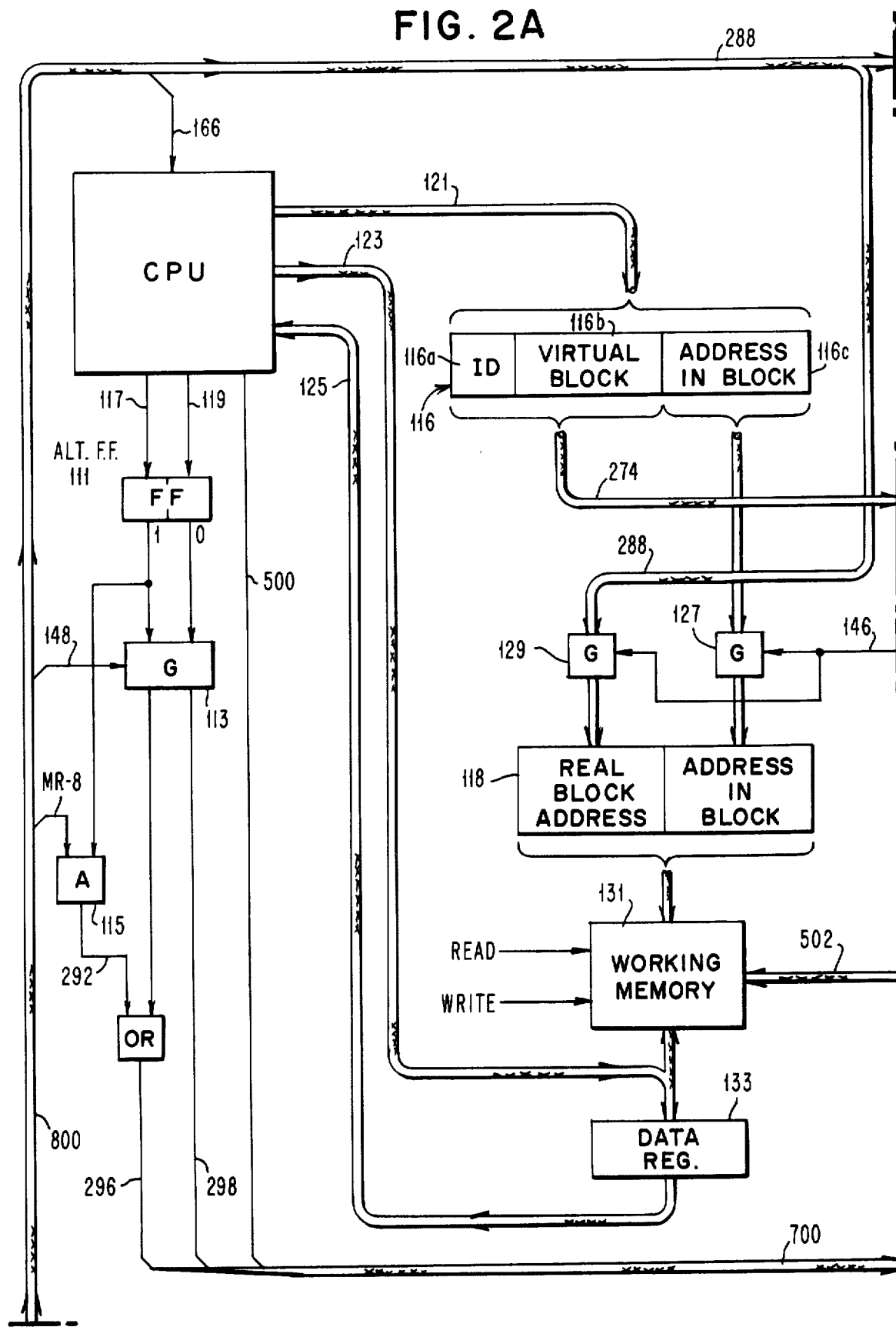
FIGS. 2A–2Z when joined, as in FIG. 2, provide a detailed logic diagram of the preferred embodiment, including timing pulse generators, to control the requisite sequencing of operations.

FIG. 1 illustrates the functions performed by the various timing sequences implemented by the apparatus shown in detail in FIGS. 2A–2Z. There are six such timing sequences.

MR-1 – MR-10 Memory Request
R-1 – R-10 Replace
RR-1 – RR-10 Rewrite and Replace
PF-1 – PF-98 Page Fault
$\tau$1-1 – $\tau$1-61 Tau 1
$\tau$2-1 – $\tau$2-61 Tau 2

These timing sequences will be treated in detail in the detailed description, but only the branch and re-entry nodal points will be referred to in the general description of FIG. 1.

All memory requests originate with the central processing unit (CPU). In a virtual memory system, the CPU requests a program page by program and vitrual block number. This is sufficient to find the sought program material, whether it is in working memory or backup storage. Thus, the CPU produces a request signal on line 10 as well as the identification of the program page on other lines not shown. This request initiates the "Memory Request" routine which first tests the circuitry to determine if it has completed solution of the tau algorithm initiated by a previous page fault. This testing recycles until the circuits are found to be free (at MR-2) and signals on line 11.

The sought program information is then used to interrogate an associative memory which contains a roster of all pages stored in working memory. The match or no-match signals correspond to the "YES" and "NO" responses on lines 12 and 13, respectively, occurring at MR-6 time in the memory request sequence. A YES signifies that the associative memory roster includes the sought page, and it delivers the physical address where the page is stored in working memory. This is loaded into the memory address register of the working memory and the CPU is signalled to obtain access thereto at MR-10. This completes the MR routine. If the page allocation system is functioning efficiently to maintain the proper pages in memory, the MR routine will run to completion frequently.

If, however, the sought page is not found in the roster of the associative memory at MR-6, line 13 will be potentialized to initiate the page fault routine. This routine has many branches and loops which are too complex to show on a simplified diagram. Basically, it computes new weighting criteria for the pages residing in the working memory and marks the deadwood for immediate or subsequent replacement.

The NO response on line 13 (actually a no-match response from the associative memory) resets flip-flop 128 (FIG. 2H) and sets the page fault flip-flop 259 (FIG. 2H) and initiates the page fault sequence at PF-1. The page fault flip-flop 259 was the one tested at MR-1 to determine if a previous page fault routine were complete.

Since the sought page was found not be be in working memory, room must be made for it when it is fetched from the backup store. This requires that a page be bumped from memory. Therefore, the associative memory roster is interrogated for any page having marker bits "A" and "C" both equal to zero. These are stored along with the program and block numbers. An A bit equal to zero signifies that the associated page has undergone no alterations during its residence in memory. A C bit equal to zero signifies that the associated page has been marked as a candidate (C=0) for replacement.

If the associative memory finds a match YES, line 14 will set flip-flop 128 and initiate the replace routine at R-1. Since the replaced pages has had no alteration (A=0), it can get lost immediately. Therefore, the associative memory delivers the real address in working memory where the fetched block is to be written and updates the roster to list the pedigree of the new page which is brought from the backup store and entered in working memory. When so entered, the CPU is signalled at R-9 time to read the page.

Since a page fault has been found, the weighting factors must be recomputed. Therefore, at R-6 time, line 14, in addition to continuing the replace routine to termination, re-enters the page fault sequence at PF-9. The flip-flop 128 manifests the fact that a replace operation has been called for so that it will not subsequently be repeated.

If at PF-4 no page candidate was found with A=C=0, then line 16 would be potentialized to interrogate the associative memory for C=0 only. In essence, it is looking for a page marked as a candidate (C=0) but with an alteration (A=1). If this interrogation produces a YES response on line 17, this will set flip-flop 128 and initiate the rewrite and replace sequence. This differs from the replace sequence only in that the replaced page must be rewritten in the backup store before it can be replaced, as it has undergone alteration (A=1). Therefore, it requires one more cycle point, signalling the CPU at RR-10. Like the replace routine, the rewrite and replace routine (at RR-7) returns control to PF-9 via line 18.

Both the replace and rewrite and replace routines search the associative memory for the presence of C bits equal to zero and move a pointer to the next C=0 position to control the replacement.

If at PF-8 time no candidate for replacement was found (C ≠ 0), then NO line 19 would be potentialized to enter PF-9 directly, and flip-flop 128 would have remained reset to zero as no replacement candidate was found. The lack of a replacement candidate, although very improbable as will be seen, requires that at least one be found, as there is a memory request waiting, demanding space in memory.

The block labelled "compute tau algorithm and mark associative memory with C=0" covers a complex routine that can best be summarized without reference to any specific drawings, although its function and the apparatus for implementing these functions will hereinafter be described in detail.

Every access to the working memory increments an access counter which in the instant embodiment is a 10 bit modulo 1024 counter. Every page in working memory has a reference register as a part of its "pedigree" in the associative memory roster. Every access to a page in the working memory resets its associated reference register to zero. The reference registers of all non-accessed pages are incremented by one count whenever the access counter goes to zero on the 1024th count. Thus, the pages with the lowest reference register number have a history of most recent accesses. For example, a page with a 00000 (5 bit) reference register number has been accessed in the last 1024 memory accesses. A number of 00100 (4) signifies that the associated pages has not been accessed in the last 4 × 1024 = 4096 accesses but has been in the next access count frame (5 × 1024).

Whenever a page fault occurs, whether or not a candidate for replacement is found immediately, the reference registers in the associative memory for all pages belonging to the faulting program are tested successively for counts of 0, 1, 2 ... 32 (in the binary notation) and the number of pages in each reference register count group counted to create a so-called wd array with 32 entries. A count of 141 in the fifth column would signify, for example, that 141 pages of the faulting program had a reference register count of four. The summation of the wd values equals the number of pages in working memory for the given program. The wd array manifests the distribution of accesses of a given program. Optimally, it will be high at the origin and decrease therefrom.

Successive pairs of wd values are then subtracted to construct a wdd array, the second being subtracted from the first, the third from the second, etc. until the 32 wd value is subtracted from the 31st to produce 31 differences. There are 31 columns of wdd values.

A third array of 31 entries is next constructed by dividing each wdd by a corresponding columnar value of wd, the last column of which is not used. Each of the quotients becomes a $k$ value in the $k$ array for that program.

An overall K value, or weighting norm, is next computed against which all other programs are compared. This is computed by solving the formula $$K^{NEW} = K^{OLD} + k^{new} - k^{old}/n$$

$K^{OLD}$ is stored in a register as the result of a prior computation such as the instant one.

$k^{old}$ is stored in a small associative memory in association with other data relevant to this program and used in the foregoing calculations.

$k^{new}$ is that $k$ value in the $k$ array just constructed in the tau'th column, tau also being stored in the small associative memory. Tau is some value from 0 to 31 which selects the column in $k$ array wherein $k$ lies between prescribed limits.

$n$ is the number of programs.

To achieve the foregoing, the tau value for this program is read from the small associative memory to provide a columnar address to read the $k^{new}$. The other values are read directly from memory or registers to effect the computation. Once $K^{NEW}$ is computed, it replaces the $K^{OLD}$ in the master register and becomes the norm against which the weighting factors of the other programs are compared. The $k^{new}$ for this program similarly replaces the $k^{old}$ in the associative memory and is available for a subsequent operation.

The small associative memory contains a $k^{old}$ (selected from the tau'th column of the $k$ array) for every program. This $k^{old}$ value for each program in turn is tested to satisfy the relationship $\epsilon$ is a small constant.

$$K + \epsilon \geq k^{old} \leq K - \epsilon$$

If the $k^{old}$ lies between these limits, no adjustment to tau is necessary. If not, either the tau 1 or tau 2 routines is called into play to increase or decrease tau, respectively, to find a columnar value of $k$ for this program which satisfies the relationship. These routines zero in on the target column by successive halvings and reversals when overshot. Equally successfully, but slower, one could look at one $k$ column at a time on either side of the tau'th column until the relationship was satisfied. When a suitable $k$ is found, the tau value corresponding to that column is entered in the small associative memory for that program. This is repeated for all programs to check and update their respective tau values, if necessary.

When the tau value for each program is updated, each of the pages of all programs is tested as a potential candidate for replacement using the tau value of the program to which the page is assigned. The thus-formed pages have their corresponding C bit set to zero.

The associative memory is interrogated with the program number and the tau (plus 1) for that program. The tau (plus 1) interrogates the reference register count for every page belonging to the program. Every matching page receives a zero in its C bit. Successive interrogations for tau + 2, tau + 3, etc. continue until the limit of 11111 is reached. This marks all candidates having a reference register count in excess of tau. Each program, in turn, is similarly examined using its own tau value, and its pages are marked for replacement. This operation is complete at PF-71.

If at that time neither the replace or rewrite and replace routines had been entered, the flip-flop 128 would have remained reset, and line 20 would now be potentialized to look for a candidate to satisfy the need for space. The interrogation for C=0 if it produces a YES on line 21, effects a rewrite and replace operation extending from RR-1 through RR-10. This also sets the flip-flop 128 to 1.

If the use of tau for each respective program had yielded no candidates at PF-82, then NO line 22 would have been potentialized to successively reduce all taus until at least one candidate were found. Line 23 returns the control to PF-79 until a YES response is produced to branch to RR-1 for readout.

At RR-7, line 18 returns control to PF-9, which again updates all taus and looks for new candidates because the replace and rewrite routine could have incremented the modulo 1024 access counter to its limit to thus increment the reference registers and change the statistical distribution. This time around, or if the page fault routine had gone forward with a replacement routine (R or RR), flip-flop 128 will be set to 1. Therefore, at PF-71 the routine will stop by signal on line 24. This will reset the page fault 259, readying the apparatus for the next memory request.

Considerable abbreviations have been effected in the flow chart of FIG. 1. In some instances, direct counterpart circuits can be found in the detailed circuit diagram; in others, there is no counterpart. However, the functions hereinabove described will become apparent as the detailed circuit diagram is followed.

DESCRIPTION OF PREFERRED EMBODIMENT

Since the associative memory performs so vital a part of the operation, it is well to first understand the operation of the associative memory 600 and AM controls and the small associative memory 165 and its controls 163 so that the continuity of the detailed description of FIGS. 2A–2Z will not be lost by diversions into the intracacies of the controls for the associative memories.

ASSOCIATIVE MEMORY

The basic form of the associative memories 600 and 165 is more fully illustrated in U.S. Pat. No. 3,317,898, issued on May 2, 1967 to H. Hellerman and assigned to the assignee of the instant application. In FIG. 5 of that patent are shown the elements necessary to interrogate a single bit for a match with the bit introduced on the lines 621 from the mask register shown in FIG. 6, as controlled by the argument register shown in FIG. 7. The argument register presents the sought bit configuration to the mask register which can be set bit-by-bit to pass the interrogation to the associative memory. The mask register, for example, may block the interrogation of any bit position as a "don't care" position. There is one memory cell, as shown in FIG. 5 of the referenced patent, and one mask register cell for every bit position.

The associative memory cell, as shown by Hellerman, operates to detect a mismatch between the sought bit and the stored bit and energizes the line 625 upon a mismatch. This line corresponds to the lines 582a and 592a in FIGS. 3A and 4 of the instant application, and is connected to all of the bit storage cells of one word in memory.

In addition to the foregoing lines, write input lines 608 and read output lines 619 in Hellerman provide the capability of entering or extracting data from each bit cell when write select line 611 or read select line 615 is energized. The write select and read select lines each activates all of the bits of a given word, and the read and write lines activate the corresponding bits of all words.

For the purpose of the instant application, the respective bit flip-flops 609 of Hellerman are additionally interconnected as a binary counter to permit one field of the associative memory to be incremented as a binary counter upon energization of an incrementing line connected to the counter field of the associative memory.

Figure 3A:
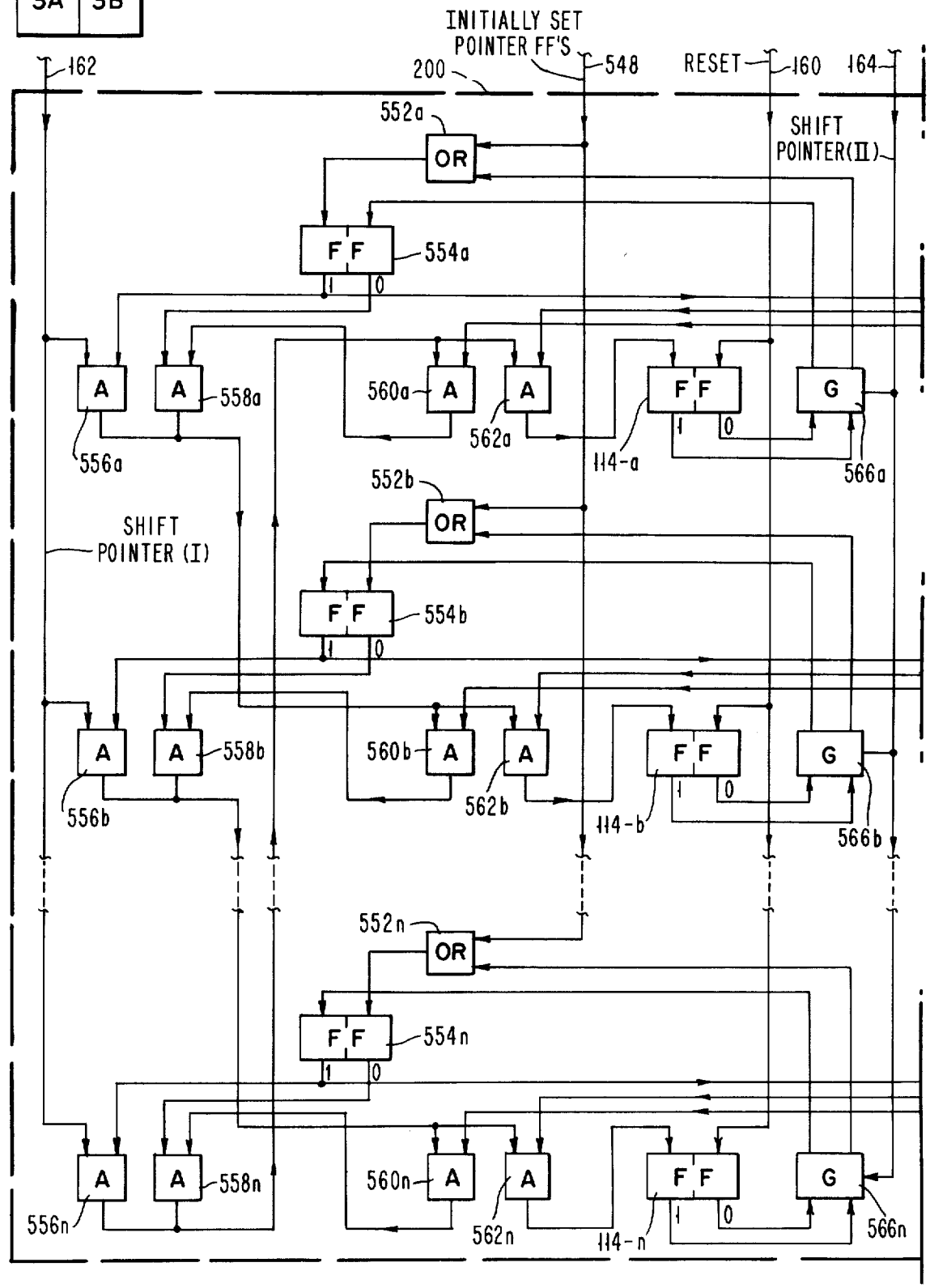
FIGS. 3A and 3B show the details of the Associative Memory Controls 200 in FIG. 2C.
Figure 3B:
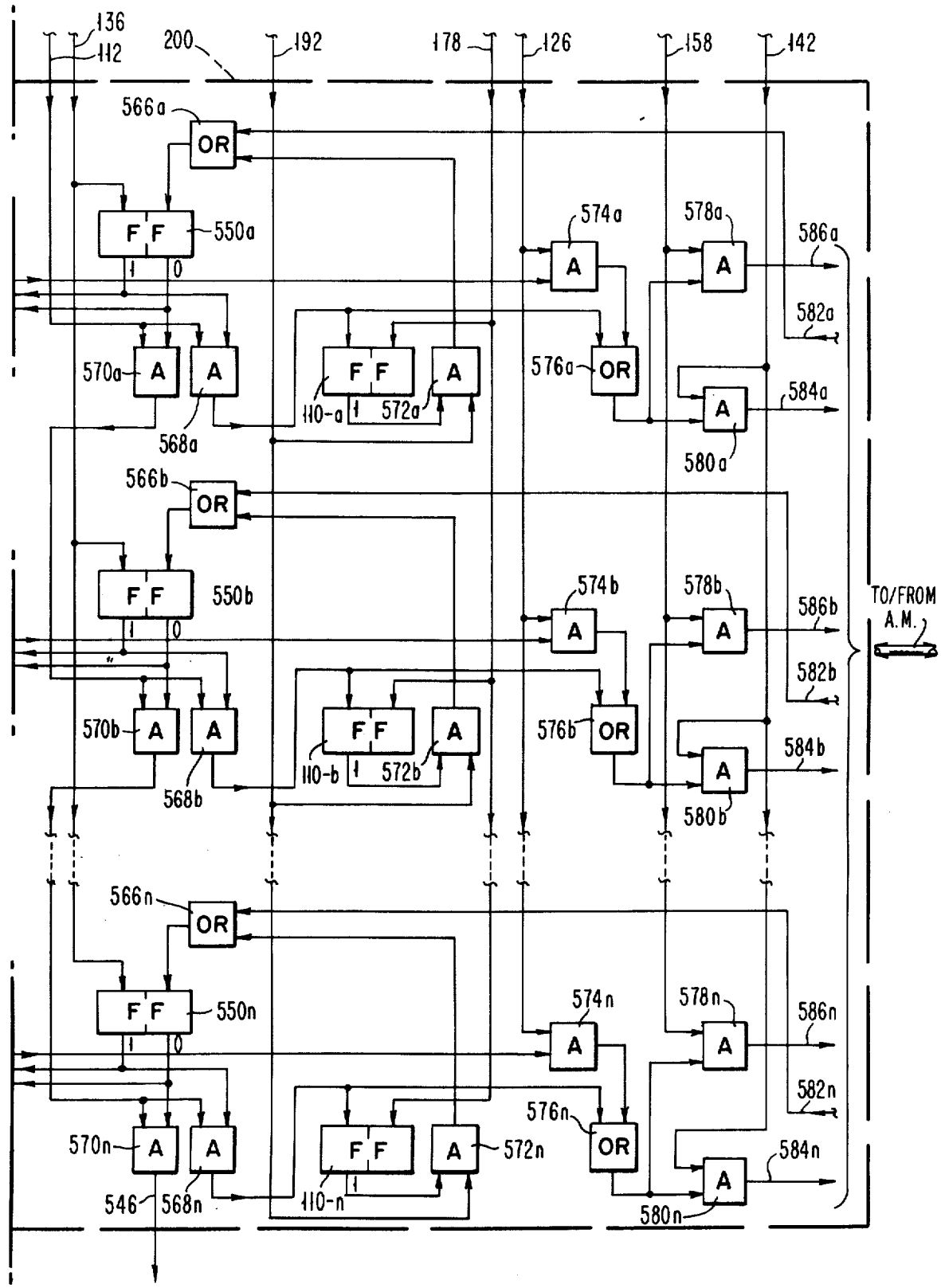

The controls for the associative memory 600 of the instant invention are shown diagrammatically in FIG. 2D as the box 200, and in detail in FIGS. 3A and 3B, wherein three representative word controls are shown in detail. The AM controls are similar to those shown in the Nelson patent, U.S. Pat. No. 3,541,529 issued on Nov. 17, 1970 and assigned to the assignee of the instant application. FIGS. 3A and 3B of that patent are relevant.

With respect to FIGS. 3A and 3B, the lines 582a, b, and n correspond to the line 625 in FIG. 5 of the Hellerman patent and lines 62 of the Nelson patent. Each of these is connected to all of the word cells in the memory 600, FIG. 2D, and respond with a signal if any one of the interrogated bit positions in the corresponding word mismatches the sought bit criteria. Since three word controls are shown, only the first or a word controls will be described.

A mismatch signal on line 582a, acting through OR 566a, will reset the mismatch flip-flop 550a to 0, it having been initially set to one by potentialization of line 136 prior to interrogation of the memory 600. Since all of the match indicator flip-flops 550 are initially set to 1 and individually reset to 0 by any mismatch on a word-by-word basis, any flip-flop 550 remaining in the 1 state manifests the lack of a mismatch, or a match, to the sought criteria.

Since for the purposes of the instant invention it is frequently necessary to test for the presence of matches in the associative memory, the line 112 is potentialized to test the flip-flops 550a to n for the existence of any one of them remaining in the 1 state. Starting at the top, line 112 coacts with the 0 state of flip-flop 550a in AND 570 to pass the interrogation to AND 570b, which if flip-flop 550b is reset to zero, passes the interrogation seriately through all intervening 570 AND gates (if the corresponding flip-flops 550 are reset to zero) to the final AND gate 470n, which depends on the final mismatch flip-flop 550n to potentialize line 546 to signal a no match of all words in the associative memory 600. Line 546 sets the end-of-line flip-flop 159 (FIG. 2C) whose 0 or 1 state is interrogated at appropriate times in the cycle. The 1 state of this flip-flop signals no match. If any one of the flip-flops 550 remains in the 1 state, its associated AND 570 will not be activated, so as to break the seriate interrogation of the following match indicator flip-flops, and the line 546 will not be potentialized, thus signalling at least one match.

When the interrogation line 112 is potentialized to interrogate the state of the match indicator flip-flops 550a–n, it also half activates AND 568a. If flip-flop 550a is in the 1 state (match), and 568a is fully activated to set the flip-flop 110a. If flip-flop 550a is in the 0 state, the potentialization of line 112 activates AND 570a to half-activate AND 570b and AND 568b. If flip-flop 550b is in the 1 state, flip-flop 110b will be set to 1. Thus, the uppermost flip-flop in the series 110a to 110n will be set to 1 to correspond to the first match indicator flip-flop 550 registering a match. The flip-flops 110 allow for the successive utilization of the flip-flops 550 for reading or writing followed by successive resetting thereof.

When the topmost match indicator flip-flop has been utilized, a reset pulse on line 192, operating through the topmost AND 572 whose corresponding match indicator flip-flop is in the 1 state, resets only that flip-flop. A following reset pulse on line 178 resets the flip-flops 110. A next following match indicator interrogation pulse on line 112 sets the next following flip-flop 110 whose corresponding flip-flop 550 is in the 1 state. This continues until all of the match indicator flip-flops in the 1 state have been exploited and line 546 signals no more matches to end the sub-cycle.

Exploitation of the match indicator flip-flops 550 to effect a read or write operation of the matching words in the associative memory is achieved by concurrent potentialization of line 112 and line 158 for writing and line 112 and line 142 for a read operation. When line 112 is potentialized, the topmost flip-flop 550 in the 1 state activates the corresponding AND 658 and OR 576 to half-activate AND gates 578 and 580. If write line 158 is also active, AND 578 is active to potentialize write line 586 in the associative memory. Potentialization of read line 142 causes a similar poentialization of read line 584. Only the topmost read or write line is activated at any one time. Successive resetting of the match indicator flip-flops 550, as hereinabove explained, permits each successive matching word in the associative memory to be read or re-written under control of the match indicator flip-flops.

A second control for read or write operations is vested in the flip-flops 554a to 554n. Initially, the topmost flip-flop 554a is set to 1 state (via OR 552a and line 548), and the remaining flip-flops 554b to 554n are reset to 0 by the pulse on line 548 and OR gates 552b through 552n. This is part of a standard startup routine where circuit elements are preset to a needed state. In any subsequent operation, only one of the flip-flops 554 will be set to 1 and all others reset to 0. The flip-flop in the 1 state stores the page frame that was last replaced. When a new page frame is sought for replacement, the marker bit is moved.

Assume, by way of example, that the interrogation of the associative memory for bumping candidates produced matches on lines 582a and 583n and flip-flop 554a is in the set state. Match indicator flip-flops 550a and 550n will be set and 550b reset. When the shift pointer (I) line 162 is pulsed, AND gate 556a will be fully enabled, while AND gates 556b and 556n will be inhibited by the lack of a set output from the corresponding flip-flops 554b and 554n, now both reset.

AND 556a half-potentializes AND 560b and AND 562b. Only AND 560b will be fully active because match indicator flip-flop 550b is reset. Therefore, the shift I pulse will proceed through AND 558b, now fully active because marker flip-flop 554b is in the zero state. This passes the pulse on to AND's 560n and 562n. Now since flip-flop 550n is set, AND 562n will be active to set flip-flop 114n to 1.

When the shift pointer (II) line 164 is next pulsed, the state of each of the flip-flops 114a–n will be gated by gates 556a–n to produce a corresponding state in the corresponding pointer flip-flops 554a–n. In the instant example, the pointer will be moved to the flip-flop 554n and all others will be reset to zero. It is noted that even though the first word line registered a match, its pointer was moved to the next matching page position indicator.

With the pointer thus moved, it is necessary to specify the page frame to be bumped by reading out the word in the associative memory under control of the marker bit. This is achieved by potentializing lines 126 and 142. Line 126 connects to all of the AND gates 574a–n, the second inputs from which are respectively connected to the set outputs of the corresponding marker bit flip-flops 554a–n. Since only one is set, 554n in the example, only one AND gate (574n) will be active. This potentializes OR 576n and combines in AND 580n with read line 142 to apply a read pulse to word line 584n.

Figure 4:
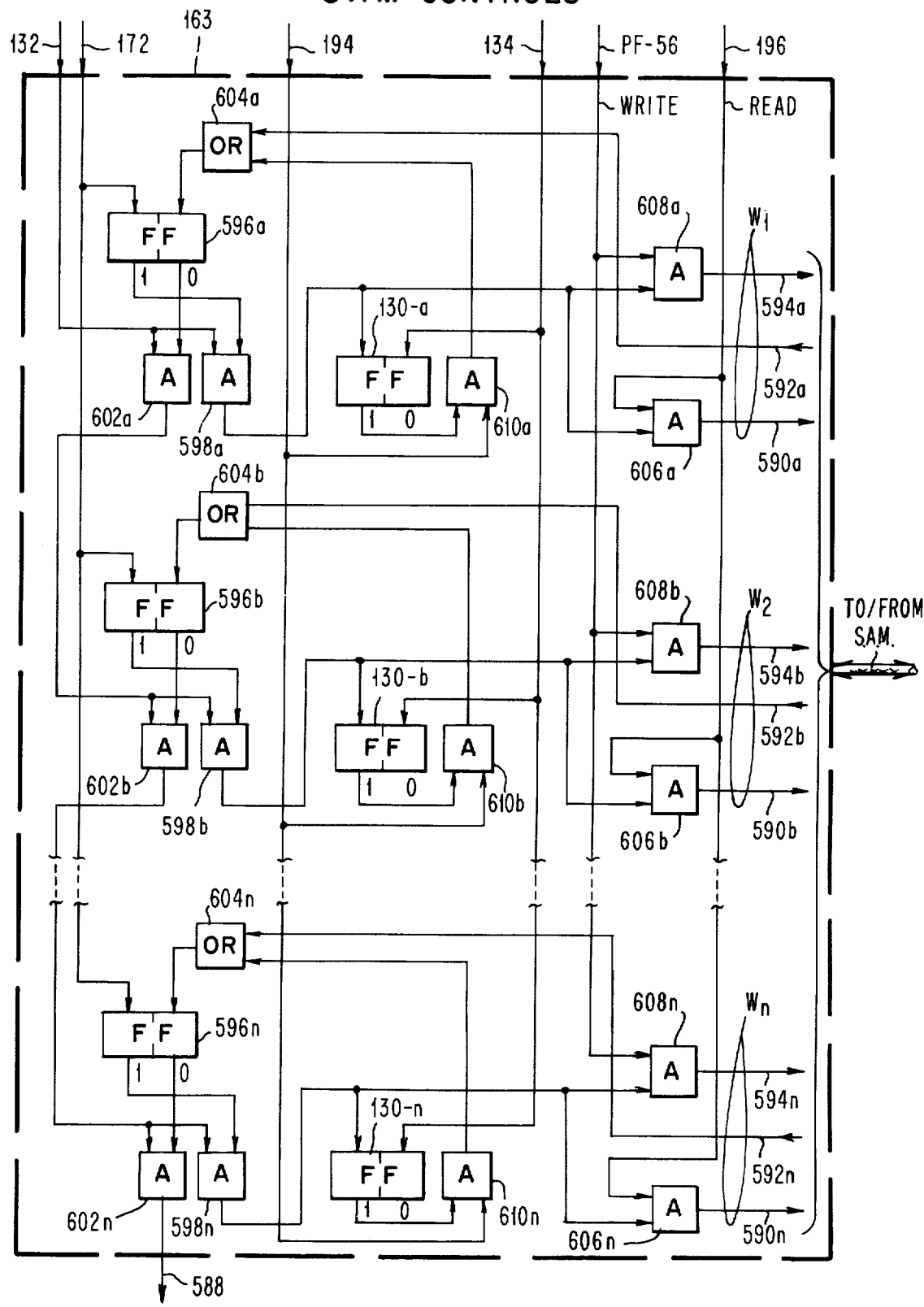
FIG. 4 shows the details of the small Associative Memory Controls 163 in FIG. 2E.

The small associative memory (SAM) controls 163 (FIG. 2E) are shown in detail in FIG. 4. They contain the same circuitry for effecting serial reading or writing of multiple matching words as do the more complex associative memory controls just described. The SAM controls do not contain the pointer flip-flops, the circuits for shifting the pointer, and the read and write controls under control of the pointer.

Corresponding parts of the SAM controls 163 and the AM controls 200 are to be found on FIG. 4 and FIG. 3B, respectively as follows:

| SAM | AM |
|---|---|
| 132 | 112 |
| 172 | 136 |
| 194 | 192 |
| 134 | 176 |
| WRITE | 158 |
| READ | 142 |
| 594 | 586 |
| 592 | 582 |
| 590 | 584 |
| 588 | 546 |
| 596a-n | 550a-n |
| 604a-n | 566a-n |
| 602a-n | 570a-n |
| 598a-n | 568a-n |
| 130a-n | 110a-n |
| 610a-n | 572a-n |
| 608 | 578a-n |
| 606 | 580a-n |

By substitution of reference characters, the explanation of the AM controls can be applied to the SAM controls.

The utilization of the associative memory and the small associative memory will be explained in the overall logic description and timing, where the functions hereinabove described will be assumed to occur when the appropriate control inputs are applied to the AM controls 200 and SAM controls 163.

NORMAL MEMORY REQUEST OPERATION

Every request by the CPU for a page, whether it be in the working store or backup store, begins with a request for the page. The first operation is to determine if it is in working memory by interrogating the associative memory 600 which stoes the location of every page in working memory.

The CPU initiates a request by loading the register 116 (via cable 121) with the program I.D. virtual block number, and address in the block, and potentializing wire 500, all of which are to be found in FIG. 2A. The CPU also potentializes either the line 117 or 119 to set or reset the alteration flip-flop 111 to denote that the sought page is to be altered (1) or not altered (0). If the page is to be altered, this must be recorded as the backup store must be updated to correspond when the page is bumped from the working store.

Figure 2E:
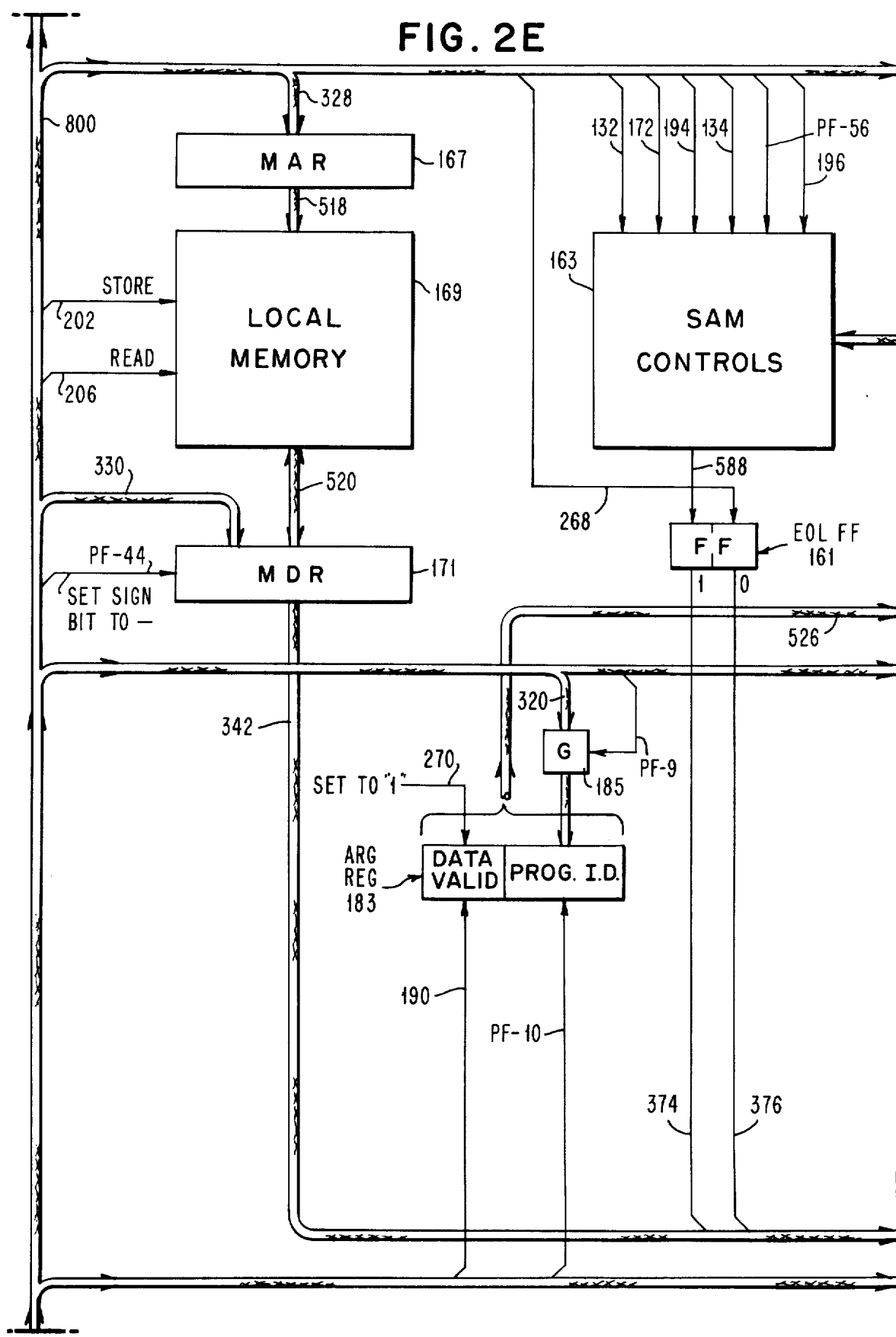
FIG. 2 is a joining diagram for the sheets containing FIGS. 2A–2Z.
Figure 2F:
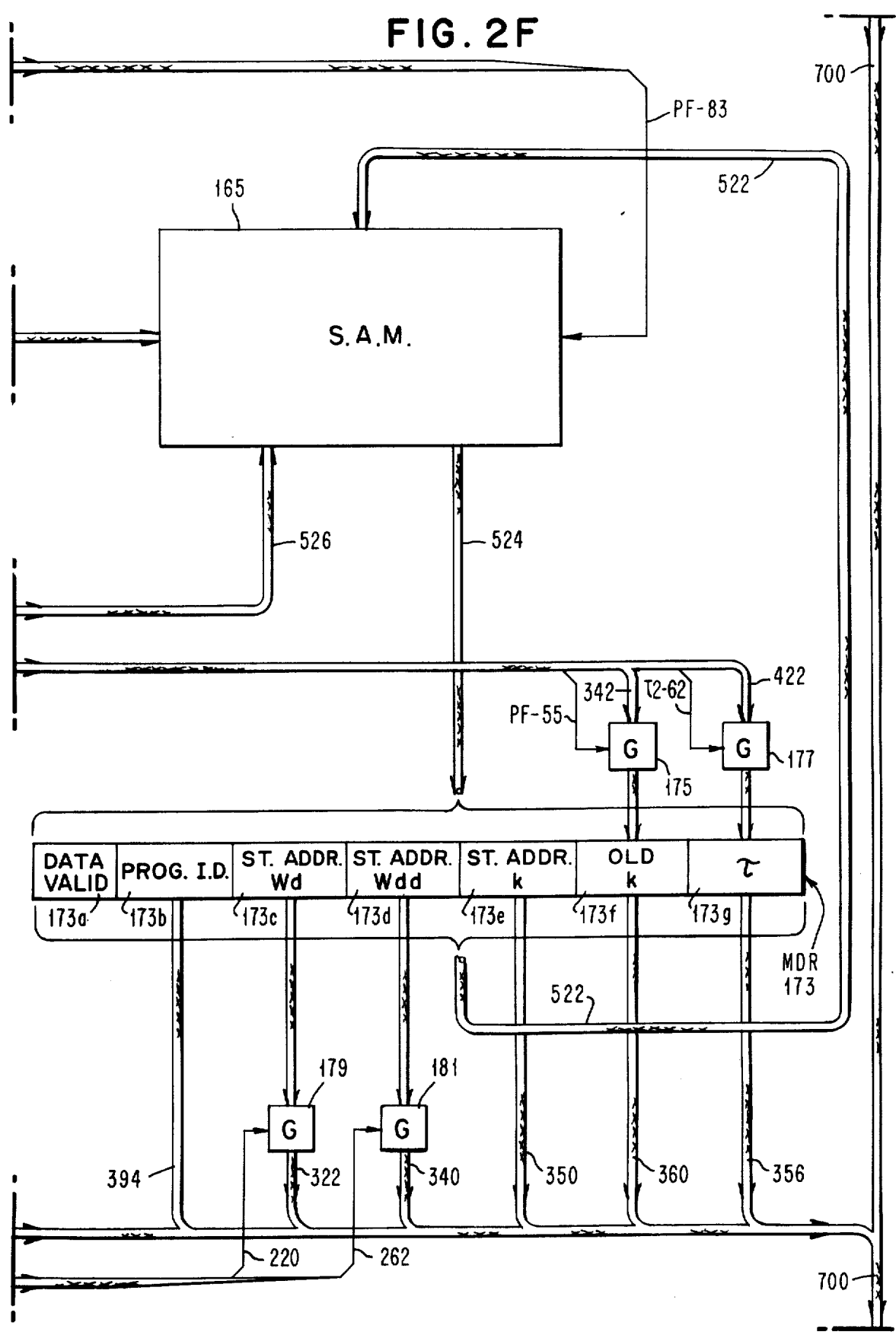
Figure 2H:
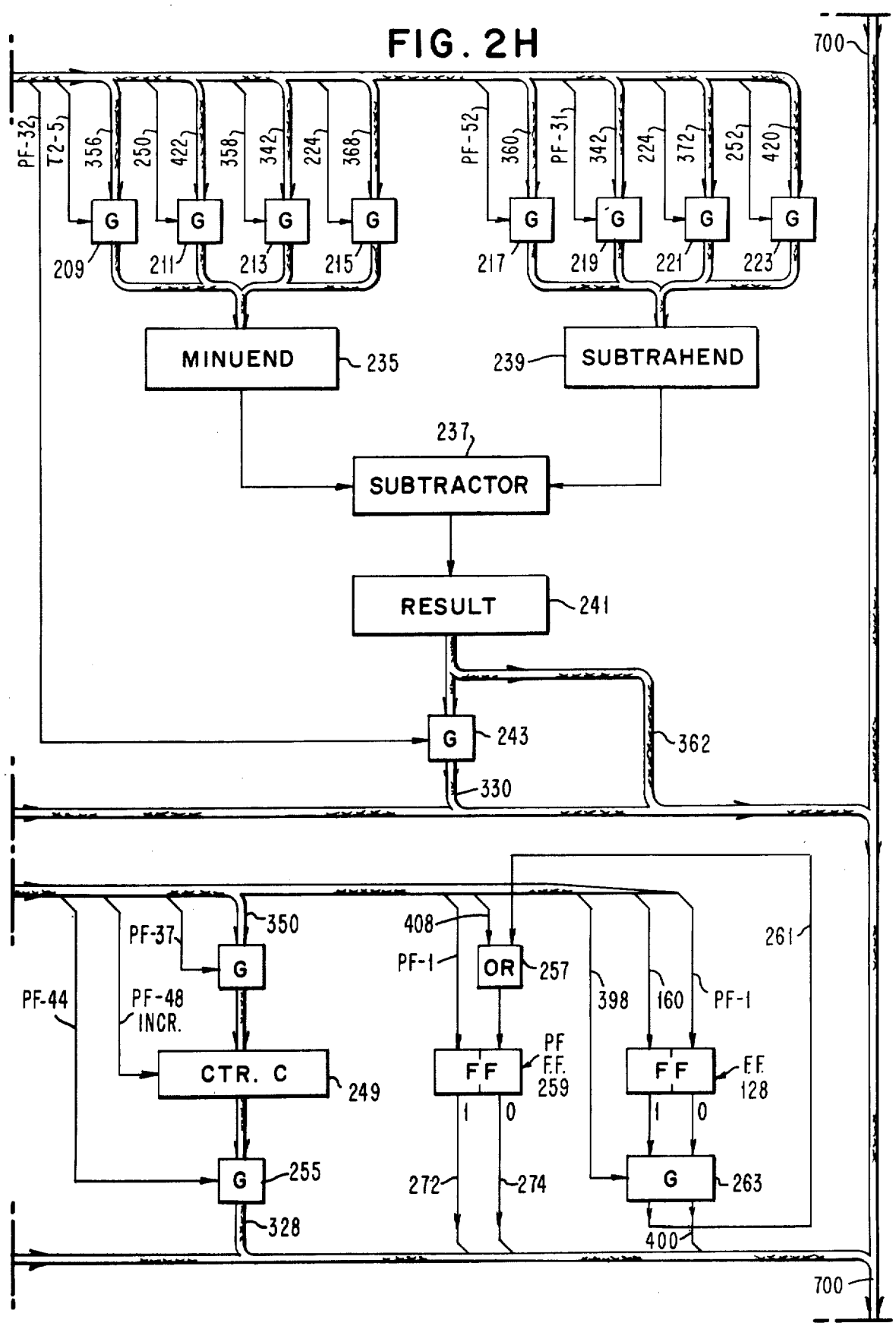
Figure 2J:
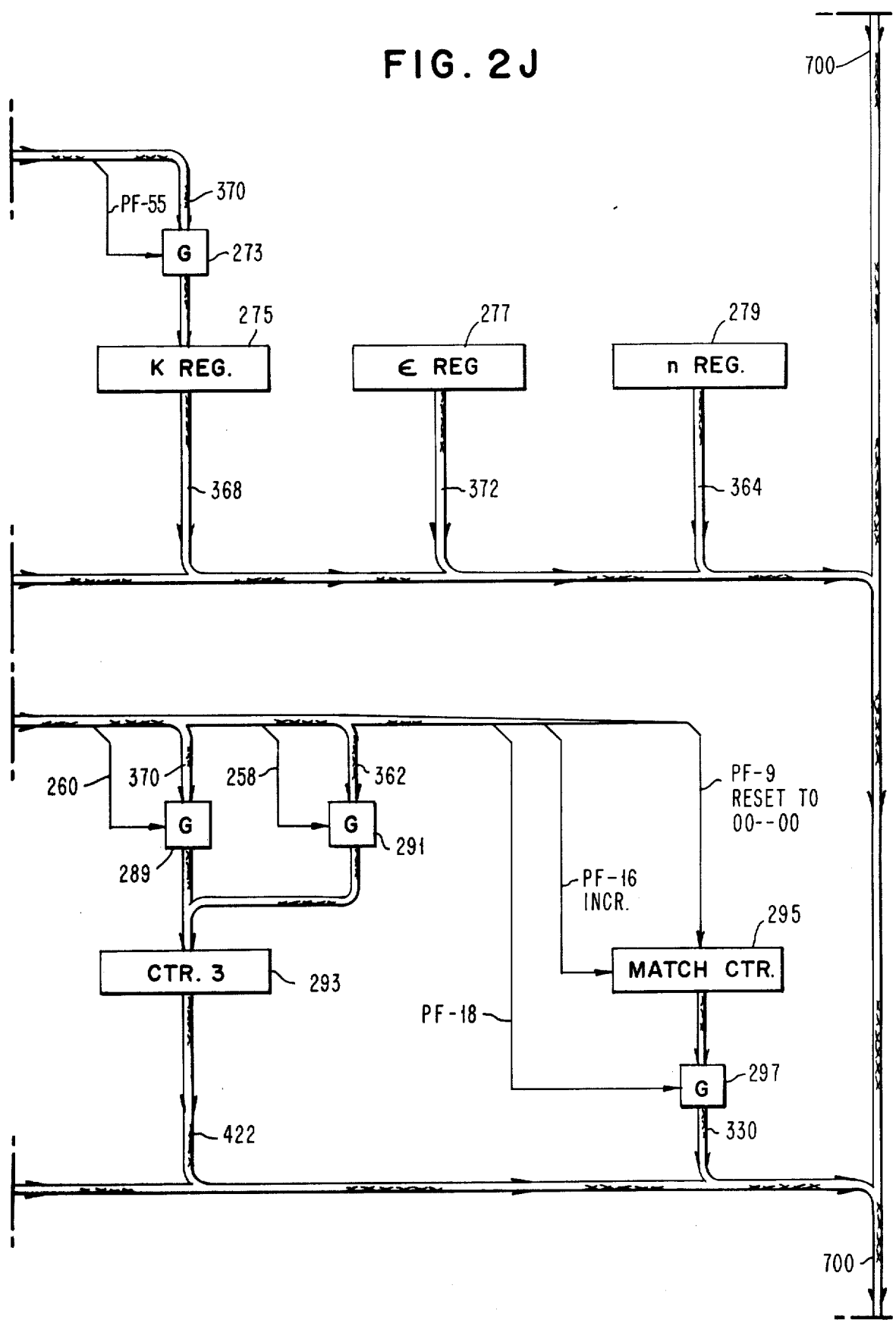
Figure 2K:
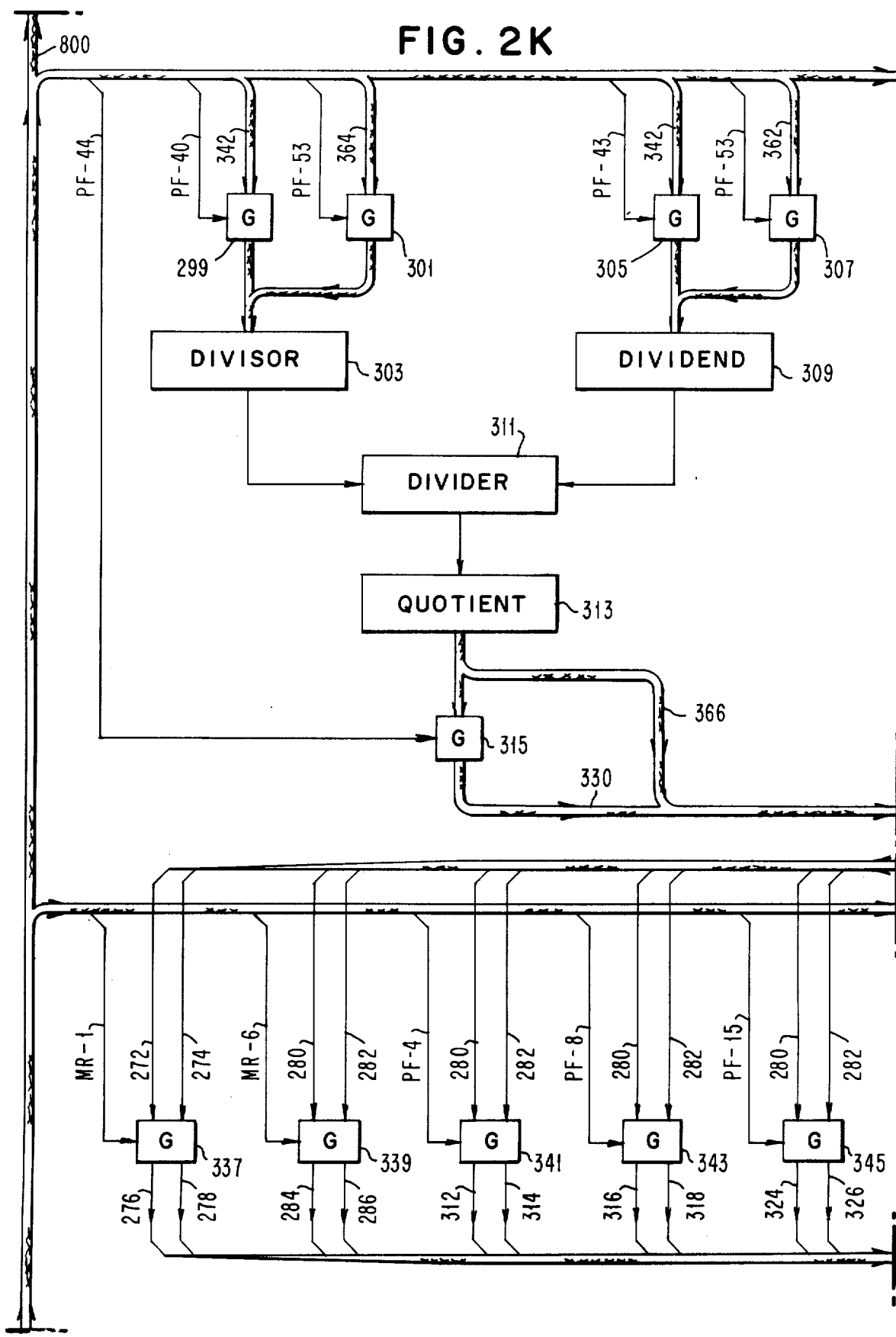
Figure 2L:
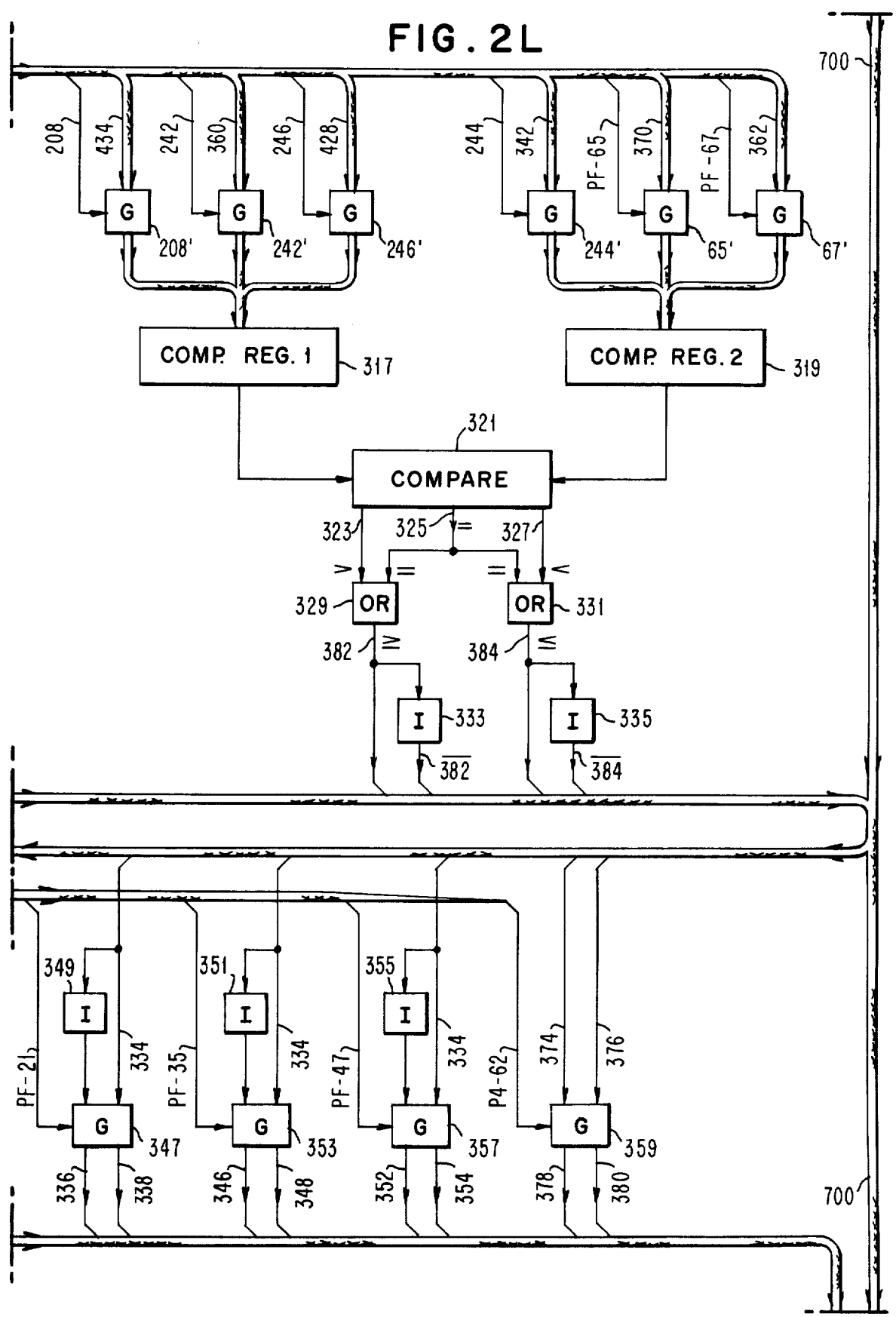
Figure 2M:
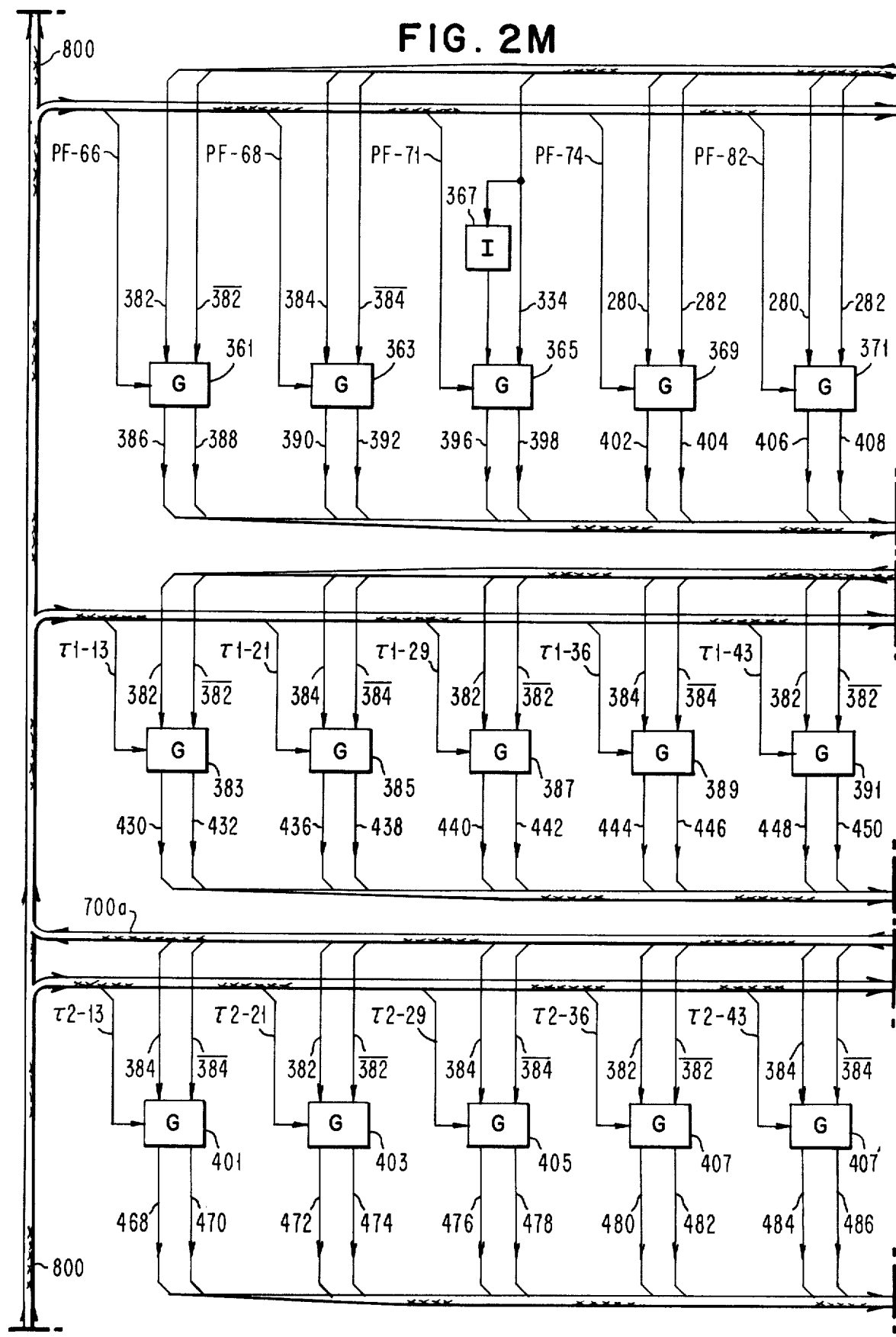
Figure 2N:
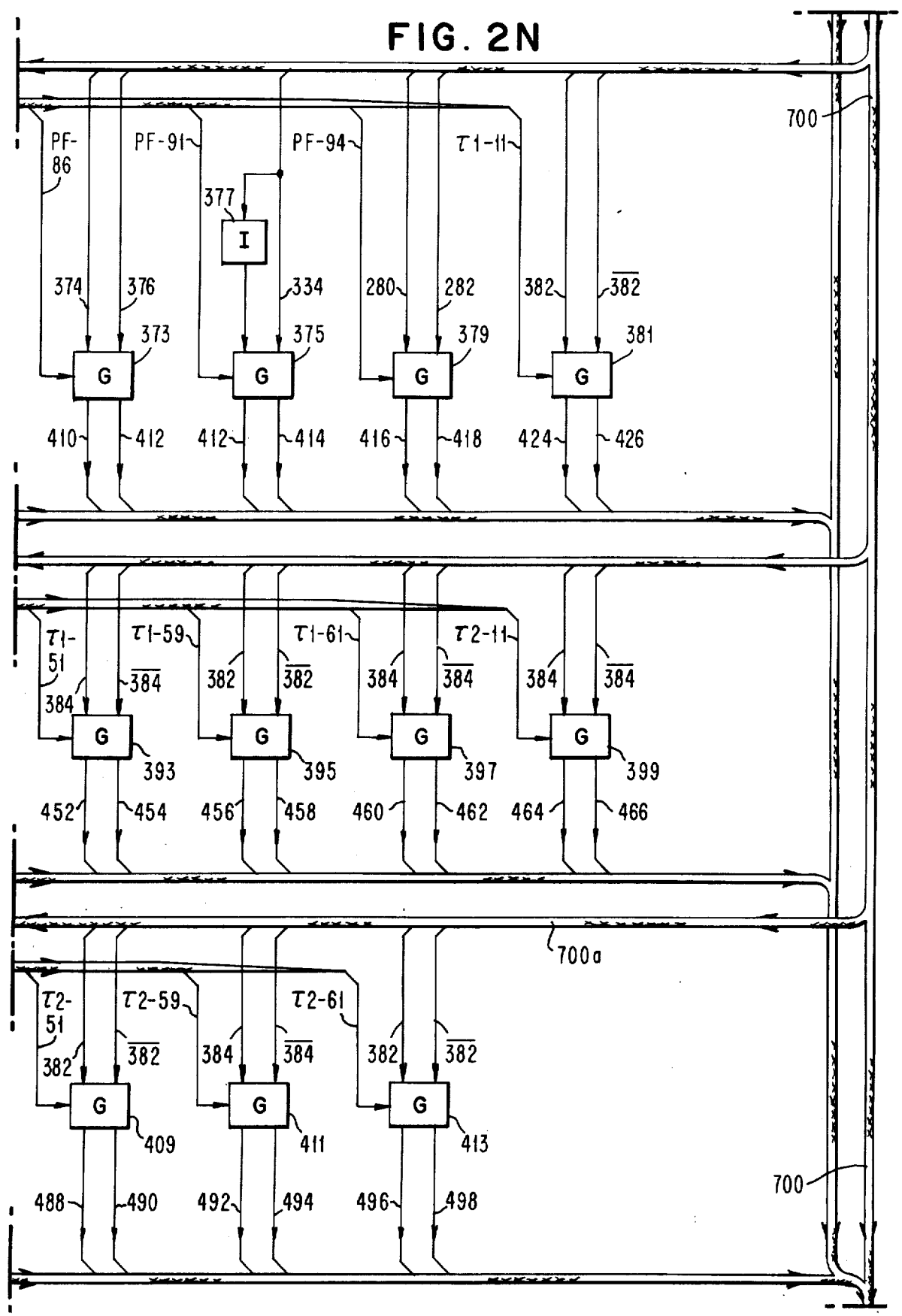
Figure 2O:
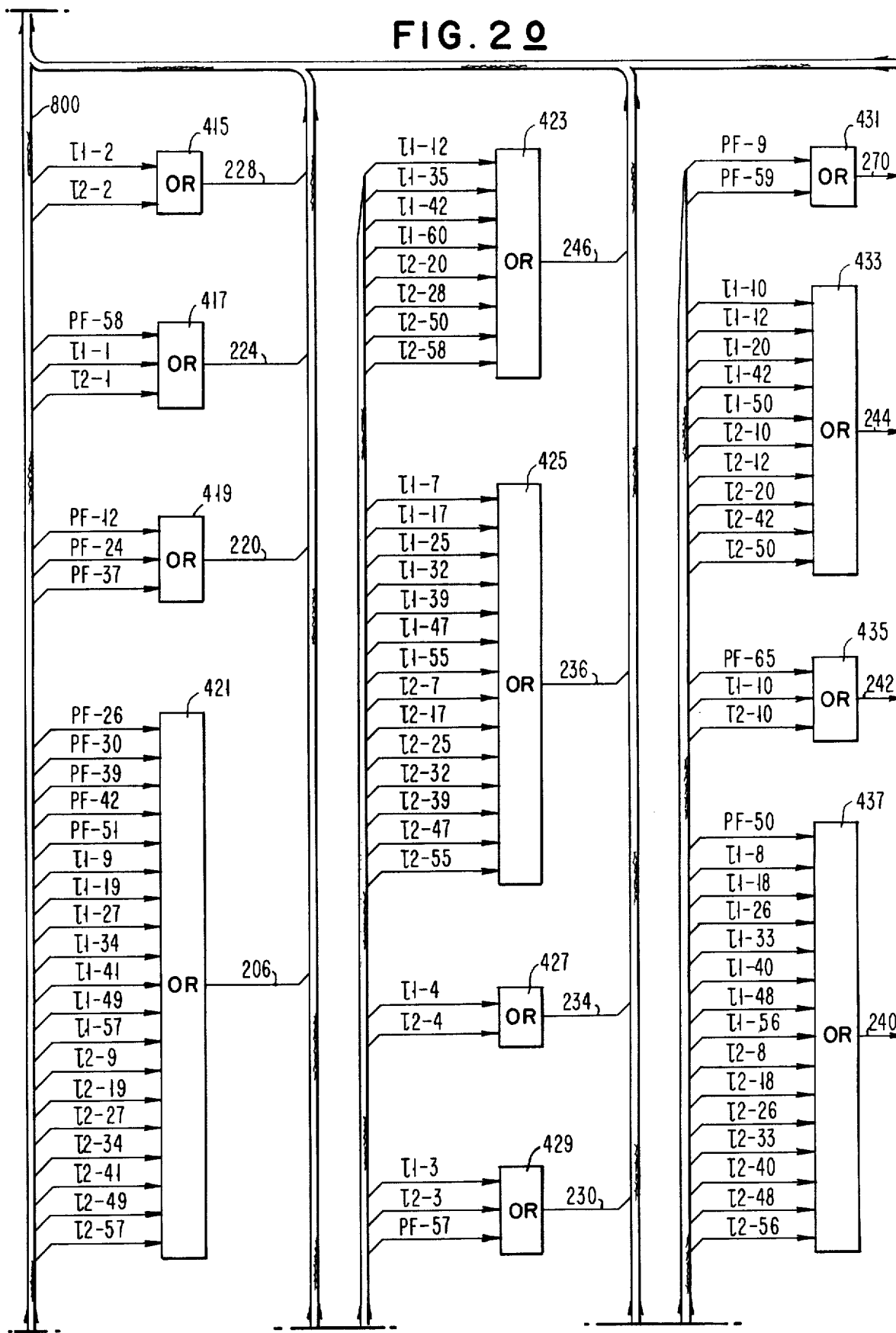
Figure 2Q:
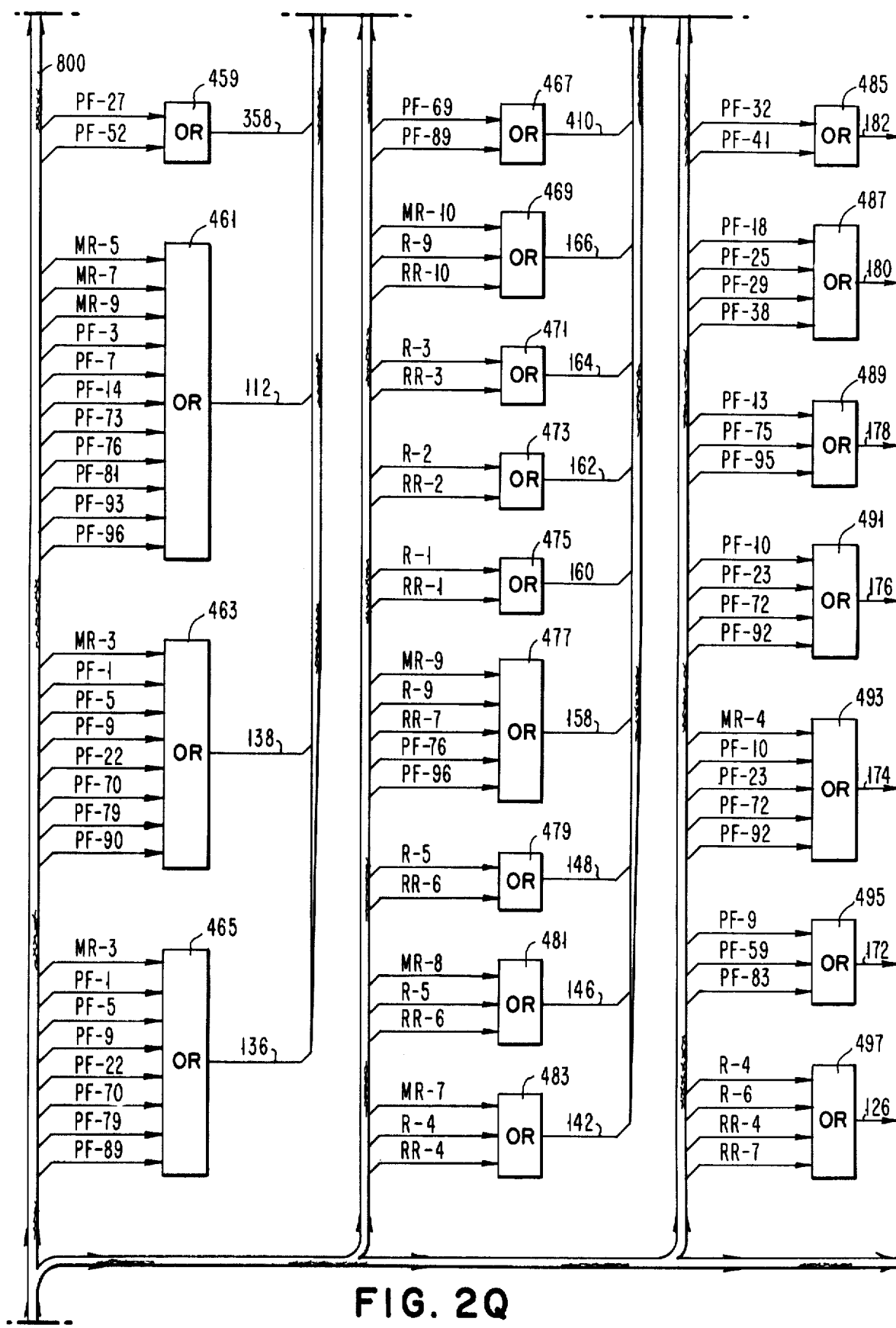
Figure 2R:
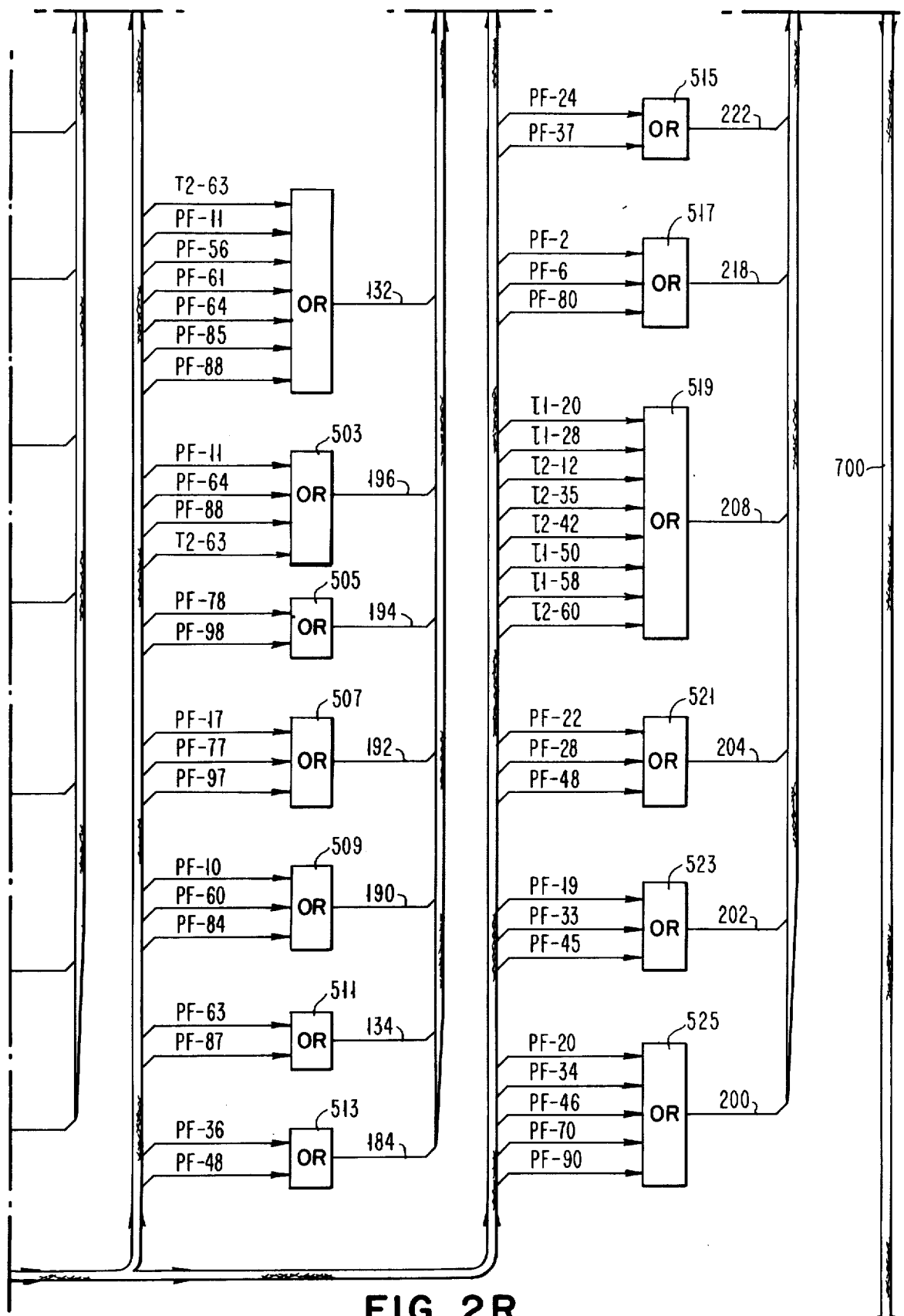
Figure 2S:
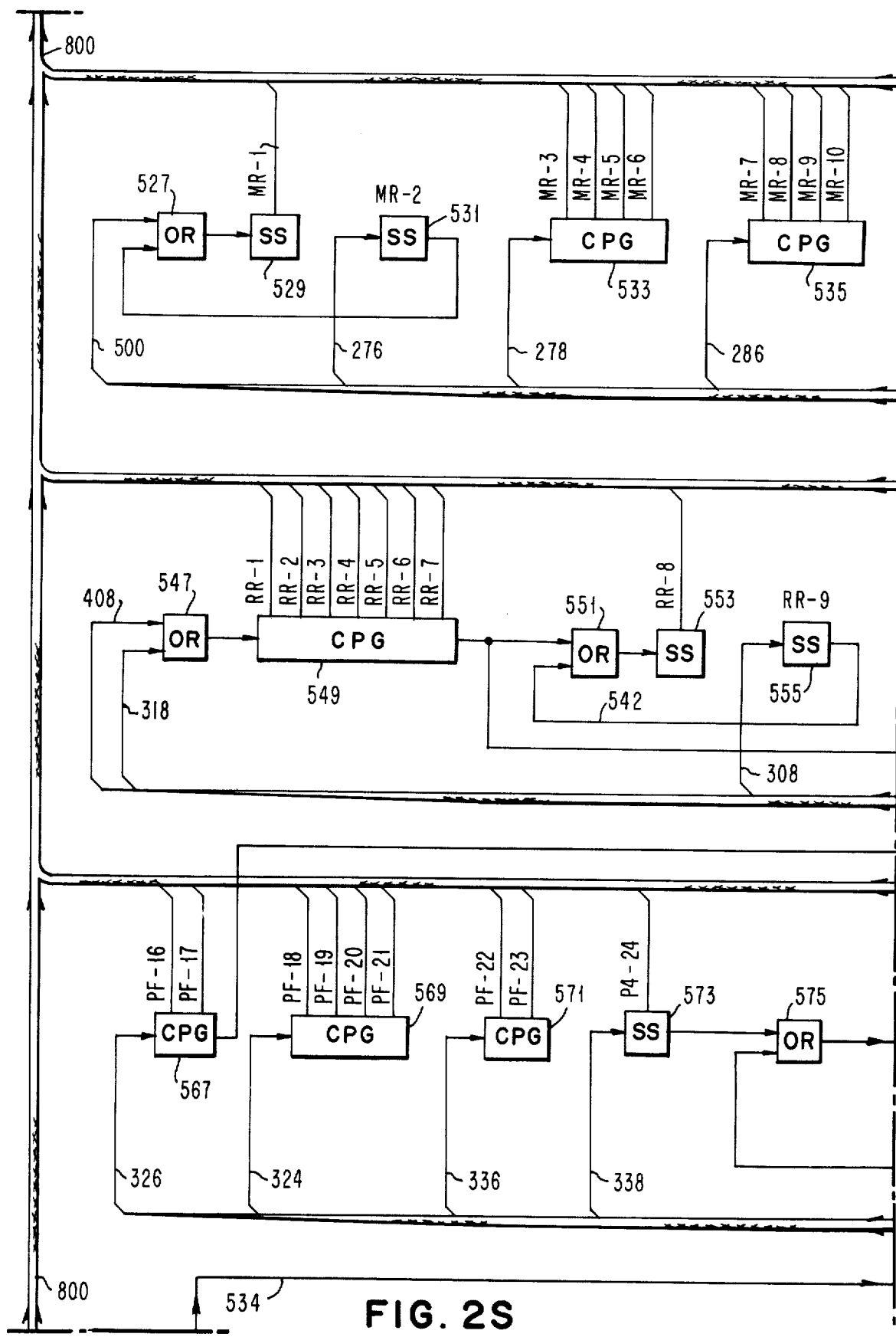

The line 500 enters cable 700 and exits therefrom on FIG. 2S where, via OR 527, it fires single shot 529 to produce the MR-1 pulse. Single shots such as this are cascaded or individually coupled by means of intervening logic to control the various machine operations. Where they are cascaded, the box is labelled "CPG"

(clock pulse generator) with the appropriate number of lines exiting therefore, each labelled with its corresponding timing pulse designation.

The MR-1 (memory request) enters cable 800 and exits therefrom on FIG. 2K to open gate 337 to test lines 272 and 274 connected respectively to the set and reset outputs of the page fault flip-flop 259 (FIG. 2H). This flip-flop is set upon the onset of a page fault and remains set until the page fault operations are completed. In effect, MR-1 is asking whether the page fault is still active (line 272 hot) or finished (line 274 hot). The gate potentializes line 276 or line 278 to manifest the state of the page fault flip-flop. If busy, line 276 fires single shot 531 (FIG. 2S) to yield the MR-2 pulse which fires single shot 529 repeatedly until the flip-flop is reset to zero, and the test potentializes line 278 which in FIG. 2S fires the first of the cascaded single shots in CPG 533 to initiate the succession of timing pulses MR-3 through MR-6.

The MR-3 pulse gates the program I.D. and virtual block number from register 116 (FIG. 2A) to the argument register 151 (FIG. 2C) of the associative memory. This is effected by connecting the MR-3 pulse wire to gate 618 which passes the content of cable 274 from register 116 to the argument register. The MR-3 pulse also sets the match indicator flip-flops 550a–n in the AM controls by potentializing set line 136, and resets the end-of-line flip-flop 159 (FIG. 2C) by potentializing line 138. Line 136 originates with OR 465 (FIG. 2Q) to which the MR-3 pulse is inputted. Similarly, OR 463 produces the potential on line 138 at MR-3.

With the argument register loaded and the AM controls prepared for interrogation, the MR-4 pulse and line 174 potentialized at MR-4 time via OR 493 (FIG. 2Q) apply the bits entered into the argument register to the bit interrogation lines of the associative memory via cable 514. The program I.D. and virtual block number are thus compared with those fields of all words in memory, and the word lines 582a, b, n will respond with all 1's or one 0 and the rest 1's, as there can only be one match. The page identification is unique and can only produce one match.

The match indicator flip-flops are interrogated at MR-5 time by potentializing line 112 in the AM controls, line 112 originating in OR 461 (FIG. 2Q) which has an MR-5 input. As explained in the description of the AM controls, line 112 tests all of the match indicator flip-flops 550. If none resides in the 1 state, the line 546 is potentialized to set the end-of-line flip-flop 159 (FIG. 2C) to signal no match.

At MR-6 time, the status of the end-of-line flip-flop is interrogated by opening gate 339 (FIG. 2K) to pass the potential on line 280 (1) or 282 (0) to lines 284 and 286 respectively. If a match is signalled, line 286 fires the first single shot in the CPG-535 to produce MR-7 and following pulses. A match signal manifests the presence of the sought page in the associative memory and derivatively in the working memory. The next following pulses read the storage location from the associative memory into the address register of the working memory and signal the CPU to proceed to access the memory.

Specifically, the MR-7 pulse potentializes line 112 and read wire 142 in the AM controls to produce a readout of the matching word from the associative memory as hereinabove explained. Line 112 receives its potential from OR 461 (FIG. 2Q), and line 142 is potentialized from OR 483, both having MR-7 as an input. The readout from the associative memory 600 enters the following into the AM memory data register 147 (FIG. 2D): A bit; C bit; program I.D.; virtual block No.; real block No.; and reference register count.

The potential on line 142 also increments the modulo 1024 counter 267 (FIG. 2I) to count the access.

The MR-8 pulse performs the following functions:
 1. Gates the address in block from register 116 to 118 by opening gate 127 from line 146, originating in OR 481, having MR-8 as an input. The address in block originated with the CPU and was entered coincident with the service request.
 2. Gates the real block from MDR 147 to register 118 (FIG. 2A) via gate 129, opened by line 146.
 3. If modulo counter (FIG. 2I) is zero, it increments all of the reference registers in the associative memory. Decoder 269 yields an output when the counter 247 reaches zero, which output is combined in AND 253 with line 146 which is hot at MR-8 time. The output line 190 increments the reference register portion of the associative memory, the bit cells of which are interconnected as a binary counter as hereinabove explained.
 4. Resets reference register portion 147f of the memory data register of the AM 600 via line 146 connected to the reset side of those register bits.
 5. If alteration flip-flop 111 (FIG. 2A) is 1, while the A bit in MDR register portion 147a to 1. This is achieved by combining the set output of flip-flop 111 with the MR-8 pulse in AND 115 to potentialize lines 292 and 296 via the OR gate. Line 296 connects to the set input of the A bit register 147a.
 6. Sets write mask 149 of AM 600 to all 1's, thus permitting writing into memory the total content of the MDR 147.

AT MR-9 time, line 112 and write line 158 are concurrently pulsed to write the content of the MDR into the word position in memory found to have matched in the interrogation, the match indicator flip-flop never having been reset. Additionally, the original word is substantially duplicated with possible changes in the A bit and the reference register count. All other bits remain the same.

MR-10, the last pulse in this chain, signals the CPU to access the data via line 166 originating in OR 469 (FIG. 2Q). The operation just described looked at the associative memory, determined that it was present, and extracted the real block for use by the CPU. It also counted the access and reset the accessed page's reference number to zero. If the access was for alteration, that was recorded. Finally, it added a count of one to the reference registers of all non-accessed pages recorded in the associative memory if the modulo 1024 access counter had reached its limit.

PAGE FAULT

If at MR-6 time when the match indicator flip-flops 500 were tested for a match by testing the state of the end-of-line flip-flop 159, there were no matches, line 284 would have been potentialized to initiate the page fault routine, the timing for which is labelled PF-1 to PF-98. A page fault indicates that the sought page is not in working memory and thus not listed in the associative memory. This requires that the sought page be fetched from the backup store and entered into the working memory. Necessarily some other page must be bumped from the working memory to make room. If the page to be bumped has had no updates during its residence in working memory (A bit=0), it can be overwritten. If it has been altered (A=1), then the backup store must also be updated. This gives rise to two possible branches in the page fault routine.

Figure 2T:
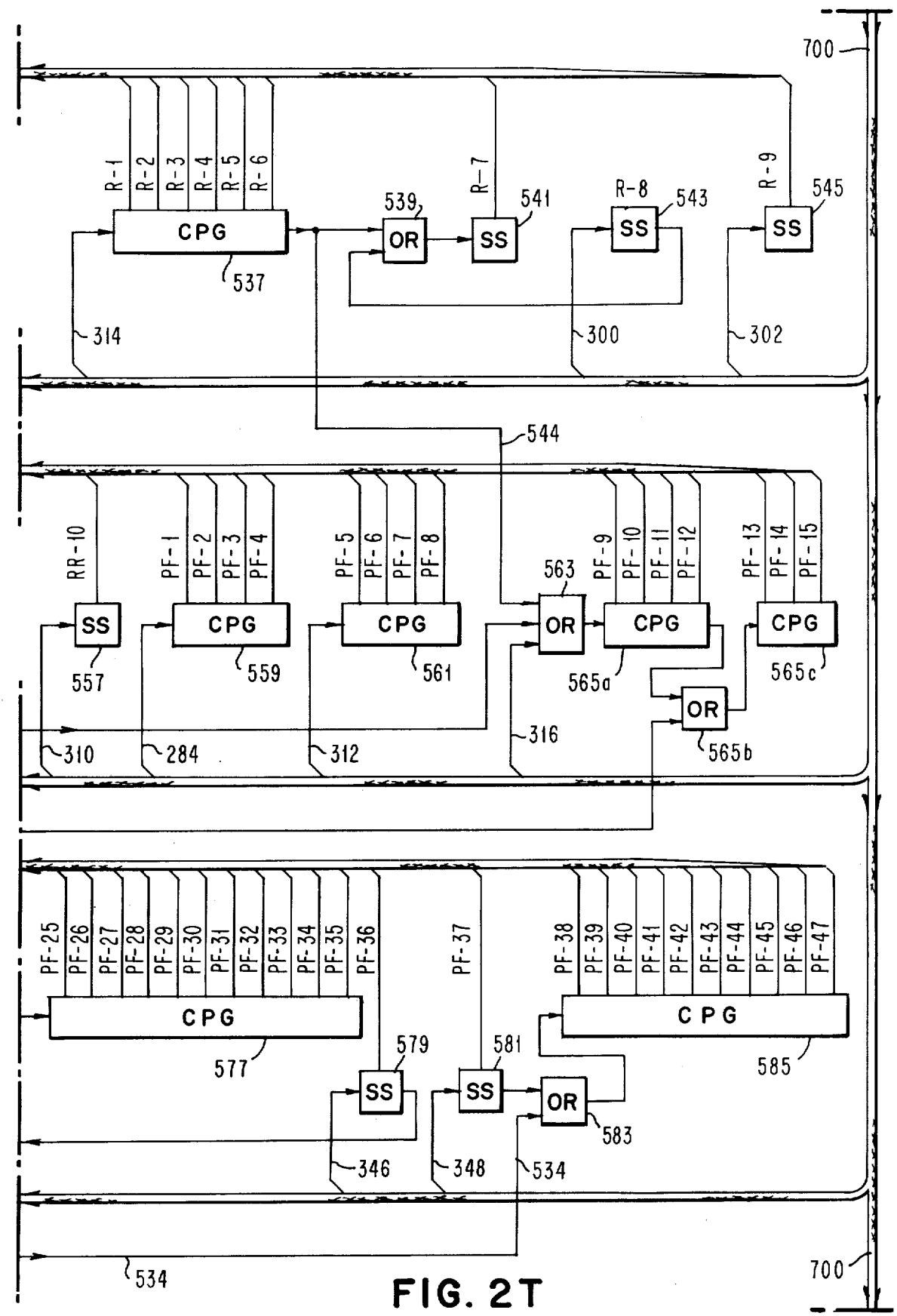

Line 284 fires the first of the single shots in CPG 559 (FIG. 2T) to initiate the series of timing pulses PF-1 through PF-4. The PF-1 pulse sets both the A and C bits in the AM argument register 151 to zero. A candidate for bumping is being sought which has no alterations (A=0) and which has been marked for replacement (C=0). The PF-1 pulse resets the A-bit register directly. The C-bit register is reset by line 264 from OR 449 (FIG. 2D) to which the PF-1 pulse is inputted.

The PF-1 pulse also performs the following:
1. Sets the match indicator flip-flops 550 in the associative memory controls to one by pulsing line 136 from OR 465 (FIG. 2Q).
2. Resets end-of-line flip-flop 159 (FIG. 2C) via line 138 and OR 463.
3. Resets flip-flop 128 (FIG. 2H) to zero and sets page fault flip-flop 259 to one.
4. Initializes the delta tau value in shift register 265. This is a hard wired connection to the set and reset inputs of the respective bit cells.

PF-2 and line 218 (from OR 517 FIG. 2R) activate the A and C bits in the AM argument registers 151a and 151b to interrogate the memory for any page whose A and C bits are both zero. PF-3 interrogates the match indicator flip-flops by potentializing line 112 from OR 461 (FIG. 2Q). This will produce either no match, while potentializes line 546 and sets end-of-line flip-flop 159 to 1 or a match with end-of-line flip-flop 159=0. At PR-4, the state of the flip-flop 159 is interrogated by means of gate 341 (FIG. 2K) opened by PF-4. This will potentialize line 312 (not match) or line 314 (match).

Line 312 advances the timing to PF-5. Line 314 initiates a replace block routine, whose timing sequence is labelled R-1 to R-9.

The no-match situation detected at PF-4 to potentialize line 312 will be treated first. This line activates CPG 561 (FIG. 2T) to produce the PF-5 through PF-8 pulses. These pulses, as will now be explained, will interrogate the associative memory for a bumping candidate whose C bit is 0, it being assumed that if it is found, it will have A=1 because the first interrogation failed.

PF-5 sets the notch indicator flip-flops 550 in the associative memory controls to one by means of line 136 and the end-of-line flip-flop to zero by means of line 138, as heretofore explained. PF-6 activates OR 517 (FIG. 2R) to drive line 218 which compares the C=0 bit in register 151b with the C bit of each word in the associative memory. It is noted that the A and C bits are split to enable this separate interrogation. PF-7 searches the match indicator flip-flops for a match and either sets the end-of-line flip-flop 159 (no match) or leaves it at zero.

The state of this flip-flop is tested as previously, this time using gate 343 opened by PF-8 to potentialize line 316 (no match) or 318 (match).

No-match line 316 will initiate timing pulse PF-9 as will the branch routines now to be described.

If a PF-4 time a word satisfying the criteria A=0 and C=0 had been found, a replace block operation would have been initiated. If at PF-8 time a word having C=0 were found, this would initiate replace and rewrite block operation, necessitated because the page had been altered. Since the two routines are substantially identical, they will be described together.

The PF-4 test pulse potentializes line 314 to produce R-1 pulse (CPG 537 FIG. 2T)). In a similar manner, the PF-8 test pulse will potentialize line 318 to produce the RR-1 (CPG 549 FIG. 2S). Once initiated, these two routines proceed in substantially the same manner, differing principally in that the rewrite and replace requires a few extra steps.

R-1 and RR-1 both reset the flip-flops 114 in the AM controls preparatory to shifting the pointer, as heretofore described in the associative memory section. Both pulses cause potentialization of line 160 by means of OR 475 (FIG. 2Q) to which these pulses are connected. The next operation activates the shift point (I) line 162 by connecting the R-2 and RR-2 pulses to OR 473 (FIG. 2Q).

The R-3 and RR-3 pulses both activate OR 471 to potentialize line 164, the shift pointer II line. As previously explained, the pointer will be shifted to the next following matching word line. In the "R" routine, this will be the word wherein A=0 and C=0 in the RR routine to the word wherein C=0. The word to which the pointer has been moved is now to be read out.

R-4 and RR-4 both apply a pulse to the read line 142 and wire 126 to cause a readout of the matching word to which the pointer has been moved. Line 142 originates with OR 483 (FIG. 2Q) to which MR-7, R-4, and RR-4 are connected. Line 126 comes from OR 497 having as inputs R-4, RR-4, R-6, and RR-7.

The readout of the matching word identifies the bumping candidate by entering into the AM MDR 147 the A-bit, C bit, program I.D., virtual block, real block, and the reference register count. Since this is a page request, the R-4 and MR-4 pulses also increment the modulo 1024 counter via line 142.

At this point, the two routines diverge. RR-5 gates the program I.D. and virtual block number from the AM MDR to register 130 (FIG. 2B) by opening gate 137 to pass the content of cable 304.

R-5 and RR-6 both perform the following:
a. Gate program I.D. and virtual block number from register 116 to the MDR of the associative memory by potentializing line 148 from OR 479 (FIG. 2Q). This opens gate 155 to pass the content of cable 274.
b. Resets the reference register portion 147f of the MDR to zero, as this word position is being set to list the page to be fetched from the backup store. Line 146 is potentialized for this purpose, it coming from OR 146 (FIG. 2Q).
c. Increments all reference registers in the AM by one count if modulo 1024 reads zero, as hereinbefore explained, using line 146 from OR 481 and line 190 from AND 271.
d. Set C bit in MDR of AM to 1 (line 148) because the new page to come in is a recent access.
e. Gate alteration bit from flip-flop 111 to A field of MDR, using line 148, gate 113, OR gate and lines 296 or 298.
f. Gate address in block from register 116 to register 118, by means of line 146 and gate 127.
g. Gate program I.D. and virtual block from register 116 to register 120, by means of line 148 and gate 135. This is for accessing the backup store.
h. Gate real block from MDR of associative memory to register 122 and to register 118. Line 148 opens gate 139 to enter cable 288 into register 122, and line 146 opens gate 129 to enter 288 in register 118.

Both routines now go to R-6 and RR-7, respectively, which perform as follows:

R-6 gives "replace" command to channel controls 100 and sets flip-flop 124 (FIG. 2B) to one. RR-7 gives rewrite and replace command to channel controls 100 and sets flip-flop 306.

Both R-6 and RR-7 perform the following:
 a. Apply a pulse to wire 126 and write line 158 in the AM controls to write the listing for the new page to be fetched, the relevant information having been previously entered in the MDR. Writing is in that word position marked by the pointer (as manifested by a set flip-flop in the series 114a to 114n).
 b. pulse OR 563 via wired connections shown on FIGS. 2S and 2T to initiate PF-9.

R-7 now tests flip-flop 124 by means of gate 143 to see if block has been replaced. Flip-flop 124 is reset by the channel controls when complete. RR-8 does the same for flip-flop 306 by opening gate 145 to test for the completion of the rewrite and replace operation.

The no outputs from these tests go to produce an R-8 or R-9 pulse which regenerates the R-7 and RR-8 pulses repetitively until the flip-flops are reset by the channel controls. The R-8 and RR-9 pulses are then skipped to produce the R-9 and RR-10 pulses, both of which signal the CPU to access the working memory by means of line 166 from OR 469 (FIG. 2Q).

Both of these operations just described searched for a word having a zero marker fit, first for one with no alterations and then, if none is found, one with a zero marker bit and an alteration. In both instances, this was done by interrogating the associative memory for the requisite match and moving the pointer to the next C=0 (or A=0 and C=0) word. This identified the storage position in working memory of the word to be bumped. In one case (no alterations) the page can be lost as there is a duplicate in the backup store. In the other, the page must be rewritten in the backup store before it is replaced with the new page. The CPU request provides the necessary identification for the fetch operation, and the associative memory identifies the available space in working memory. The listing applicable to the newly to-be-entered page is entered into the associative memory including a reference number of zero, a C bit equal to zero, and an A bit equal to 0 or 1 depending on whether the CPU merely wants to read the page or read and alter.

Since both operations involved a page fault, the control re-enters the page fault routine at PF-9 time. In fct, if a PF-8 time, when the test for C=0 was made, a candidate was not found, the RR routine would have been skipped and PF-9 entered directly.

PRODUCTION OF Wd ARRAY

PF-9 can be initiated by OR 563 (FIG. 2T) upon any one of three conditions.
 a. Failure to find a bumping candidate by searching the marker bits — line 316.
 b. Following a replace operation — from R-6.
 c. Following a rewrite and replace operation — from RR-7.

However initiated, it initiates an operation to apply the tau algorithm to create new criteria for bumping and to mark the candidates in accordance with these new criteria. The small associative memory (SAM) is now used for the first time.

The first sequence of operations involves only that program whose page fault just occurred. The program's list information remains in the argument register of the associative memory. The small associative memory is used to construct and store an array for each of the active programs.

The PF-9 pulse performs the following:
 a. Sets the match indicator flip-flop 550 in the AM controls 200 to one, via line 136.
 b. Resets the AM end-of-line flip-flop 159 to zero, via line 138.
 c. Sets the match indicator flip-flops 596 in the SAM controls 163 to one, via line 172, which originates in OR 495 (FIG. 2Q), energized at this time.
 d. Resets reference register field of AM argument register 151e to zero, via PF-9 line.
 e. Resets match counter 295 (FIG. 2J), via PF-9 line.
 f. Gates program I.D. from MDR of associative memory, via cable 320, to gate 185 and argument register of SAM (FIG. 2E).
 g. Set data valid bit or SAM argument register 183 to 1, by means of line 270 from OR 431 (FIG. 2O).

At PF-10 time, lines 174 and 176 are rendered hot from OR 493 and OR 491, respectively, to interrogate the associative memory on the program I.D. and a reference register count of zero. This effectively is asking the AM to identify all pages of that program which have been accessed in the last 1024 accesses. Also in SAM interrogation proceeds on program I.D. and the data valid bit. Non-working programs would produce a data valid bit equal to zero.

PF-11 causes SAM to read the listing for the matching word to its MDR 173 including all of the items labelled on FIG. 2E in the register blocks 173a through 173g. The starting addresses of the various labelled items refer to the locations in local memory 169 where Wd, Wdd, and k can be found for this specific program.

PF-12 gates the starting address of Wd from field 173c of SAM's MDR via gate 179 (opened at PF-12 by line 220 from OR 417 (FIG. 2O) and cable 322 to the A counter 245 (FIG. 2G).

PF-13 follows PF-12 (via OR 565b) and activates OR 489 to potentialize line 178 to reset the flip-flops 110a–n in the AM controls to zero, these being employed to provide the sequential polling of the matching lines. PF-14 follows to operate OR 461 and line 112 to interrogate the match indicator flip-flops to set or not set the end-of-line flip-flop 159. Also this interrogation of the match indicator flip-flops 550 sets the topmost flip-flop to a 1 to be used in successively polling the match indicator flip-flops.

The final pulse, PF-15, produced by CPG 565a and c tests the state of the end-of-line flip-flop 159 by opening gate 345 (FIG. 2K) to potentialize line 324 (no match) or 326 (match). A match indicates that at least one of this program's pages has been accessed in the last 1024 accesses. A match produces P-16, no match PF-18, by means of wires 326 and 324 connected to CPG 567 and CPG 569, respectively (FIG. 2S). A match will be assumed.

Upon a match, PF-16 increments the match counter 295 (FIG. 2J) and activates PF-17 which resets the topmost match indicator flip-flop 550 in a 1 state through the corresponding flip-flop 110. PF-17 returns control to PF-13 by a direct wired connection.

PF-13 through PF-17 continues to recycle until all of the match indicator flip-flops have been exploited and reset and the end-of-line flip-flop 159 is found to contain a 1 at PF-15, then PF-18 will be activated.

PF-18 gates counter A (containing the starting address of the W*d* array) to the memory address register (MAR) 167 of the local memory by opening gate 251 with line 180 from OR 487, having inputs of PF-18, PF-25, PF-29 and PF-38. PF-18 also gates the count in the match counter 295 to the MDR of local memory by opening gate 297. The following PF-19 pulse orders a store in local memory of the match counter count for the number of pages having been accessed in the last 1024 accesses. It is now necessary to count the number of pages accessed within the period 1025–2048 accesses.

PF-20 therefore increments the reference register portion 151*e* of the AM argument register by one count. On the second pass it will read 00001. Since there are 30 columns in the W*d* array, the reference register will be incremented 32 times to return the five-bit counter to zero. Therefore, to determine if all 32 columns have been counted and entered, the reference register is tested for all zeros at PF-21 time by testing decoder 153 for potential on line 334 (all zeros) or $\overline{334}$ in gate 347 (via inverter 349). Line 336 (not zero) activates PF-22. Line 338 activates PF-24. It will be assumed that the counting is not finished. Therefore, PF-22 will be activated to increment counter A to produce the next W*d* column address in local memory. This pulse also sets the match indicator flip-flops 500 in AM controls to 1, and resets the end-of-line flip-flop 159 to 0. Counter 4 is incremented by line 204 from OR 521 (hot at PF-22). Lines 136 and 138, as previously explained, reset the match flip-flop and end-of-line flip-flop. Upon cessation of PF-22, the negative slope activates PF-13 which now counts all of the matches in the second column and enters it in the second column of the W*d* array in local memory. The sub-cycle PF-13, 14, 15, 16, 17, 13 regenerates itself for as many matches as are found. It is re-entered from PF-23 31 times to count each column and enter it in local memory. The sub-cycle PF, 18, 19, 20, 21, 22, and 23 is traversed 31 times. When finally all 32 columns have been counted and entered in the local memory, the reference register will again return to zero. When tested at PF-21, line 338, as hereinabove explained, will activate PF-24.

PRODUCTION OF W*dd* ARRAY

This starts computation of the W*dd* array wherein the second column value of W*d* is subtracted from the first, the third from the second, etc. until the 32 is subtracted from the thirty-first to produce 31 differences, each called W*dd*.

We are still dealing with the same program I.D. so that the data previously entered in the MDR of SAM is still relevant. Therefore, at PF-24 the following happens:

a. Line 220 (from OR 417) opens 179 to gate starting address of W*d* array into counter A.
   b. Line 262 (from OR 451) opens gate 181 to gate the starting address of the W*dd* array to counter B.
   c. Line 222 (from OR 515) sets the reference register 151*e* portion of the AM argument register to 00001.

The reference register portion of the argument register is used as a counter to count the 31 differences now to be computed. It is preset to 00001 so that it will return to zero in 31 counts. Counter A is used to control the accessing of the W*d* array, and counter B, the accessing of the W*dd* array.

PF-25 opens gate 251 (FIG. 2G) via line 180 from OR 487 (FIG. 2Q), it being active at this time to gate the starting address of W*d* from counter A to the MAR 167 of local memory. PF-26 energizes OR 421 to potentialize line 206 to effect a readout of the first W*d* entry from local memory, it having been entered therein at PF-19. This is entered into the MDR 171 of local memory. PF-27, acting through OR 459 and line 358, opens gate 213 (FIG. 2H) to gate the first W*d* value from MDR 171 to minuend register 235, via cable 342.

PF-28 increments counter A via line 204 and OR 528 to produce the address of the second column W*d* entry, which address is gated from counter A to the memory address register 167 of local memory by PF-29 via line 180 from OR 487 and gate 251. PF-30 effects a readout of the second column W*d* value to the MDR by potentializing line 206 (from OR 421). PF-31 follows to gate the second column W*d* value to the subtrahend register 239 by opening gate 219. With entries in both the minuend and subtrahend registers, subtractor 237 yields the difference to result register 241, which at PF-32 is gated to the MDR 171 of the local memory, while at the same time counter B is gated to the MAR 167 (via OR 485 and line 182) to provide the address of the first W*dd* entry. PF-33 effects a storing of the first W*dd* value by pulsing OR 523 and line 202.

To obtain the difference of the next pair of W*dd* entries, the reference register portion 151*e* of the AM argument register is first incremented at PF-34 time from line 200 which originates with OR 525. This counter is tested at PF-35 for all zeros in decoder 153 to produce a potential on line 334 if the counter has achieved this status. Line 334 is inverted by inverter 351 and both 334 and $\overline{334}$ are tested in gate 353 to render line 348 (334) or 346 ($\overline{334}$) hot. If the counter is non-zero (lines $\overline{334}$ and 346 hot), the PF-36 single-shot 579 is fired to re-enter the cycle via OR 575 to initiate the chain of timing pulses PF-25 through PF-35 in CPG 577. This latter chain of pulses and the functions controlled thereby are repeated until all thirty-one differences are computed and entered to create the W*dd* array.

Computation of *k* Values

The next sequence of events constructs of so-called *k* array for the same program. This involves the division of each respective W*dd* by its corresponding W*d* with a minus sign appended. Since there are thirty-two columns of W*d* entries and thirty-one columns of W*dd* entries, the thirty-second W*d* entry is not employed in this calculation.

The PF-37 pulse, initiated when the reference register was tested at PF-35 time and found to contain all zeros, initiates the sequence wherein:

1. Counter A keeps track of the addresses in local memory of W*d*.
   2. Counter B keeps track of the addresses of W*dd*.
   3. Counter C keeps track of the addresses in local memory of the *k* values, and
   4. The reference register portion 151*e* of the AM argument register is used to count the 31 divisions necessary to obtain the *k* values.

The respective starting addresses of W*d*, W*dd*, and *k* are stored in SAM. Therefore, since the same program is being processed, the MDR of SAM contains this data (entered at PF-11).

At PF-37, the following occur:

1. The starting address of the W$d$ array is gated from the MDR of SAM to counter A by means of wire 220, gate 179, and cable 332 (FIG. 2F). Wire 220 originates with OR 419 (FIG. 20) to which PF-37 is inputted.

2. The starting address of the W$dd$ array is gated from SAM's MDR via gate 181, line 262, and cable 340. Line 262 originates with OR 451.

3. The starting address of $k$ array is gated from SAM's MDR to counter C by means of cable 250, and a gate opened directly by PF-37 in FIG. 2H.

4. Sets reference register 151$e$ to 00001 by means of line 22 (from OR 515).

PF-38, via OR 481 and line 180, gates the starting address of the W$d$ array from counter A to the MAR 167 of local memory by opening gate 251 to enter the contents of counter A into cable 328. PF-39 reads the first W$d$ value from local memory into MDR 171 by potentializing line 206 from OR 421. PF-40 gates the first W$d$ entry from MDR 171 to divisor register 303 (FIG. 2K) by opening gate 299 to enter the contents of cable 342.

PF-41 gates counter B (starting address of W$dd$) to the MAR of local memory by opening gate 253 by means of wire 182 from OR 485, to which PF-41 is inputted. PF-32 reads the first W$dd$ entry from local memory into MDR 171 by potentializing line 206. PF-43 gates the W$dd$ value from MDR 171 to the dividend register 309 (FIG. 2K) by opening gate 305. With the divisor (W$d$) and dividend (W$dd$) entered into their respective registers, divider 311 delivers the quotient thereof to quotient register 313.

At PF-44, the quotient register's content is gated, by means of gate 315 and cable 330, to the MDR 171 of local memory. The sign bit for this entry is set to minus by direct entry from PF-44. The starting address of the first $k$ value is entered into MAR 167 from counter C by opening gate 255. Storage of this first $k$ value is effected by potentialization of line 202 from OR 523 at PF-45. Entry of the first $k$ value is now complete. At PF-46, the reference register is incremented by one count (line 200 from OR 525) and tested at PF-47 for all zeros as hereinabove described, this time employing gate 357 to produce 354 (334) or 352 ($\overline{334}$). Since this was the first $k$ computation, line 352 will be potentialized to fire single shot 587 to produce the PF-48 pulse and reinitiate the PF-38 to PF-47 sequence in CPG 585. PF-48 also increments counters A, B, and C to produce the next addresses of W$d$, W$dd$, and $k$, respectively. Counter A is incremented by line 204 (from OR 521). Counter B is incremented by line 184 (from OR 513) and Counter C is incremented directly.

The successive divisions of the pairs of W$d$ and W$dd$ values and entry of the quotient $k$ for each is continued until thirty-one computations and entries have been made. When at PF-47 the reference register portion 151$e$ of the argument register is tested and found to contain all zeros, the creation of the $k$ array is complete. The potentialization of line 354 (all zeros) activates CPG 589 to initiate the computation of the $K^{NEW}$ value.

Computation of $K^{NEW}$

The computation of $K^{NEW}$ involves the solution of the following equation:

$$K^{NEW} = K^{OLD} + (k^{new} - k^{old}/n)$$

where $n$ is the number of programs and $K^{OLD}$ is stored in a register as a result of the prior solution of the foregoing equation. The capitalized K values are generic to all programs. The lower case $k$ values are specific to each respective program and $k^{old}$ is stored in the small associative memory for each program. The $k^{new}$ value is the $k$ value just computed in the tau'th column of $k$ array for the faulting program.

To solve the foregoing, the PF-49 pulse gates the starting address of the $k$ array from the MDR 178$c$ of SAM to the augend register 225 by means of cable 350, gate 197, OR 195 and the timing pulse. This pulse also gates the tau value from MDR 173$g$ via cable 356 to the addend register 229 by means of gate 203. The sum produced by adder 227 and entered in register 231 is the address in local memory where the value of $k$ in the tau'th column is stored. This is $k^{new}$ for the faulting program. The sum in register 231 is gated out at PF-50 by line 240 (from OR 437) which opens gate 233 (FIG. 2G) and entered into the MAR 167 (FIG. 2E) by cable 328. The $k$ value in tau'th column ($k^{new}$) is now read from local memory by applying the PF-51 pulse to OR 421 (FIG. 20) to potentialize the memory read line 206 and enter $k^{new}$ in the MDR 171.

The $k^{new}$ just entered into MDR 171 is now entered into the minuend register 235 of the subtractor by applying the PF-52 pulse to OR 459 to potentialize line 358 to open gate 213 to enter $k^{new}$. Entry of $k^{old}$ from MDR 173$f$ of SAM into the subtrahend register 239 is effected by applying PF-52 to open gate 217. The difference $k^{new} - k^{old}$ in the foregoing equation now resides in register 241, from which it is gated by PF-53 to the dividend register 309 (FIG. 2K) by means of gate 307. The divisor register 303 receives the $n$ value from $n$ register 279 by means of cable 364 and gate 301. The result of the division of the difference of $k^{new}$ and $k^{old}$ by $n$ in quotient register 313 and in cable 366 is now entered in augend register 225 by gate 193 opened by PF-54. Similarly, PF-54 opens gate 205 to gate cable 368 from K register 275 to the addend register 229. The sum register 231 now contains $K^{NEW}$ in accordance with the foregoing equation. The $k^{new}$ (tau'th column value of $k$) still resides in MDR of local memory. Therefore, at PF-55 these values are entered as follows:

1. $K^{NEW}$ is entered in K rgister 275 by opening gate 273, cable 370 originating in sum register 231.

2. $k^{new}$ becomes $k^{old}$ and is entered from MDR 171 of local memory into SAM's MDR 173$f$ by means of cable 342 and gate 175 opened by PF-55.

At PF-56, the content of SAM's MDR is written into SAM by pulsing line 132 and the write line. The write line is directly pulsed by PF-56 and line 132 is pulsed from OR 501. Word selection is under control of the match indicator flip-flop 596, remaining set from PF-10 when SAM was first interrogated for the program I.D. and data valid bit. SAM now has a new $k^{old}$.

This finishes the specific computation applicable to the faulting program. The next sequence of operations examines each program in turn to determine if its tau value needs to be changed in view of the $K^{NEW}$ value just computed and entered in the K register 275 at PF-55.

Testing Tau for Each Program

This sequence of operations looks up the $k^{old}$ for each running program and tests it for the relationship $$K + \epsilon \geq k^{old} \geq K - \epsilon$$

$\epsilon$ is a small constant which is held in register 277 and is used to prevent undue calculations if $k^{old}$ is substantially equal to K. If the foregoing relationship is satisfied, no adjustment is made to the program's $k$ value nor to its tau value. Actually the foregoing relationship is tested in two stages.

The first stage tests if $k^{old} \geq K + \epsilon$. If so, it enters the tau 1 routine. If not, it tests for $k^{old} \geq K - \epsilon$. If this is so, it initiates a tau 2 routine. The tau 1 routine effects an increase in the program's tau value. The tau 2 decreases the tau value for the program under test.

The test starts with PF-57 which is the next pulse produced by CPG 589 after PF-56. The PF-57 gates the K register 275 to the augend register 225 by opening gate 191 with line 230 from OR 429. The wire 230 also opens gate 201 to gate the $\epsilon$ register 277 to the addend register 229. PF-58 follows immediately to gate the K register 275 to minuend register 235, and the $\epsilon$ register 277 to the subtrahend register 239, using wire 224 (from OR 417) to open gates 215 and 221, respectively, to effect the entries. The value $K + \epsilon$ is now added and registered in sum register 231. $K - \epsilon$ appears in result register 241.

The first valid program is now sought in SAM by:
1. Setting valid indicator bit to 1 in argument register 183 via line 270 from OR 431 pulsed at PF-59.
2. Setting match indicator flip-flops 596a–n in SAM controls by pulsing line 172 from OR 495, which has PF-59 as an input.
3. Reset SAM EOL flip-flop 161 to zero by means of line 268 from OR 447.

Figure 2U:
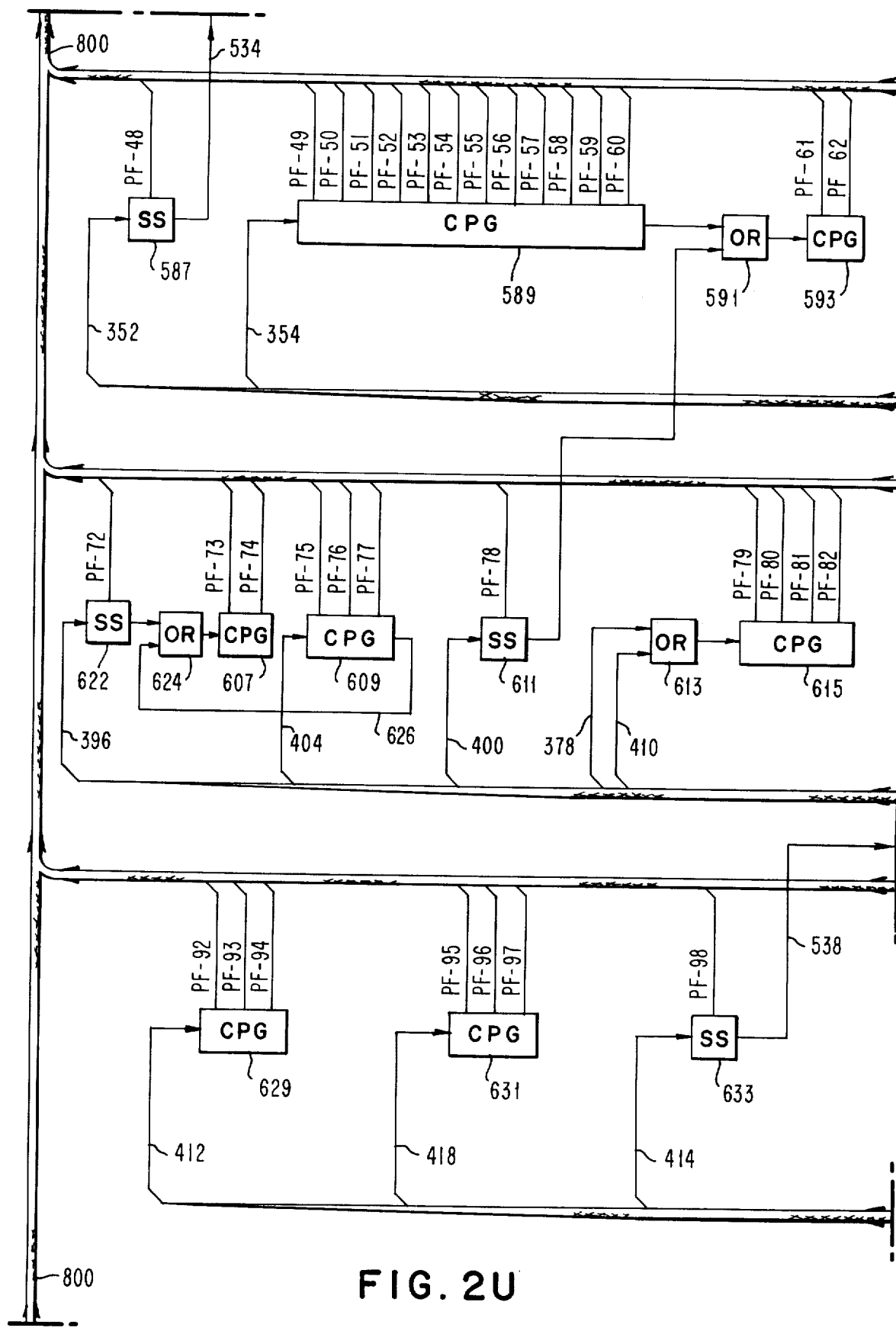
Figure 2V:
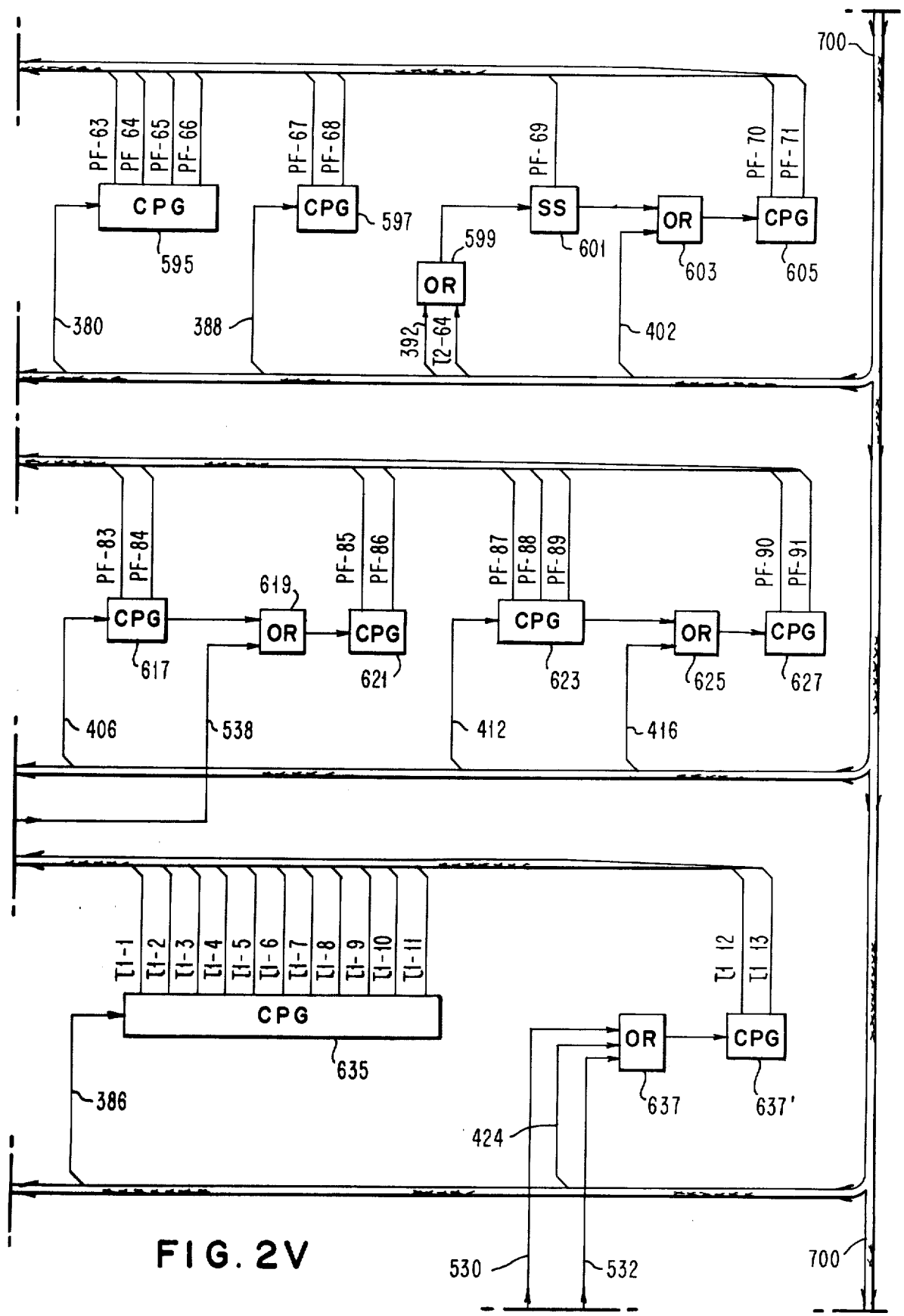
Figure 2W:
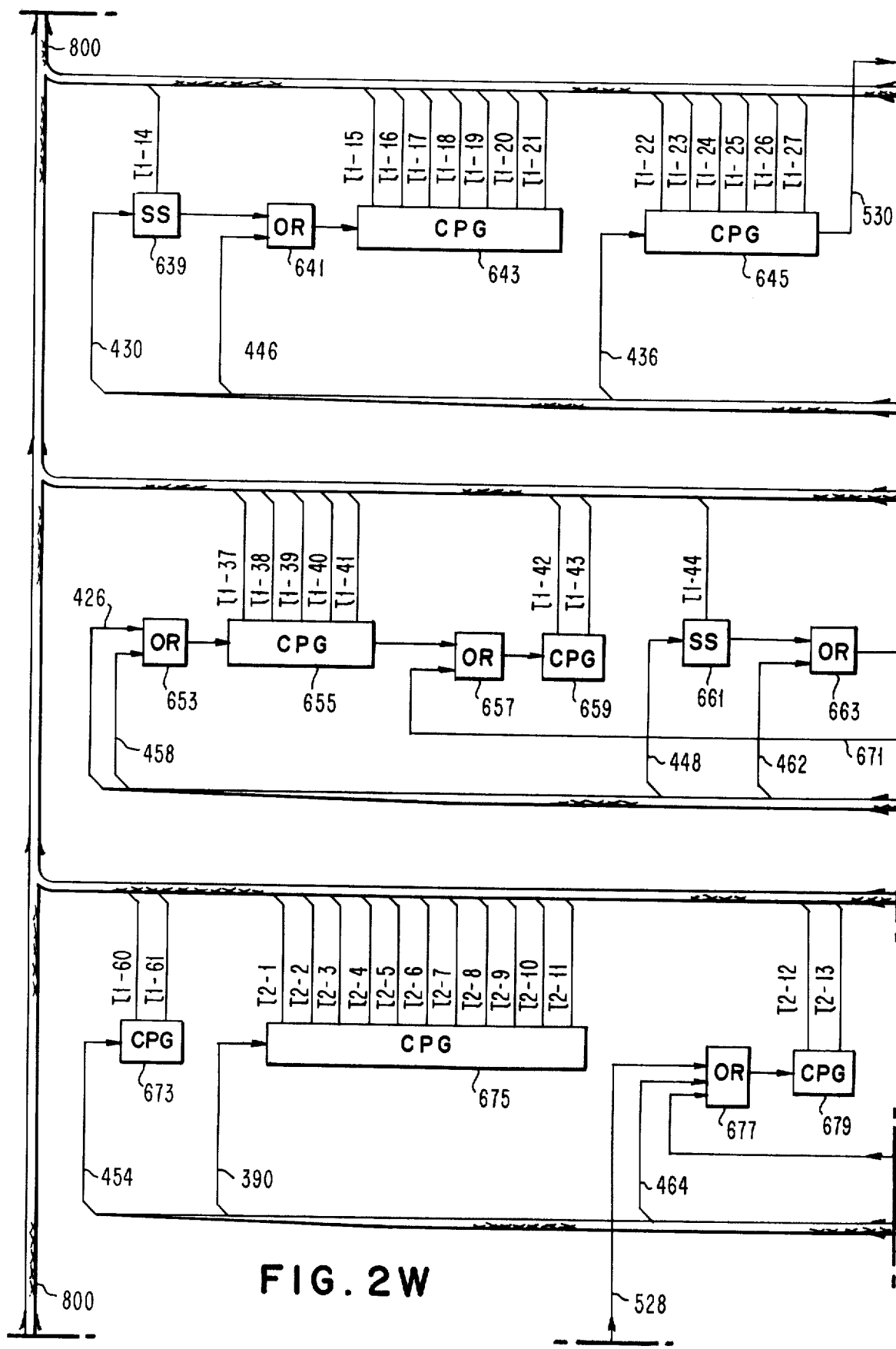
Figure 2X:
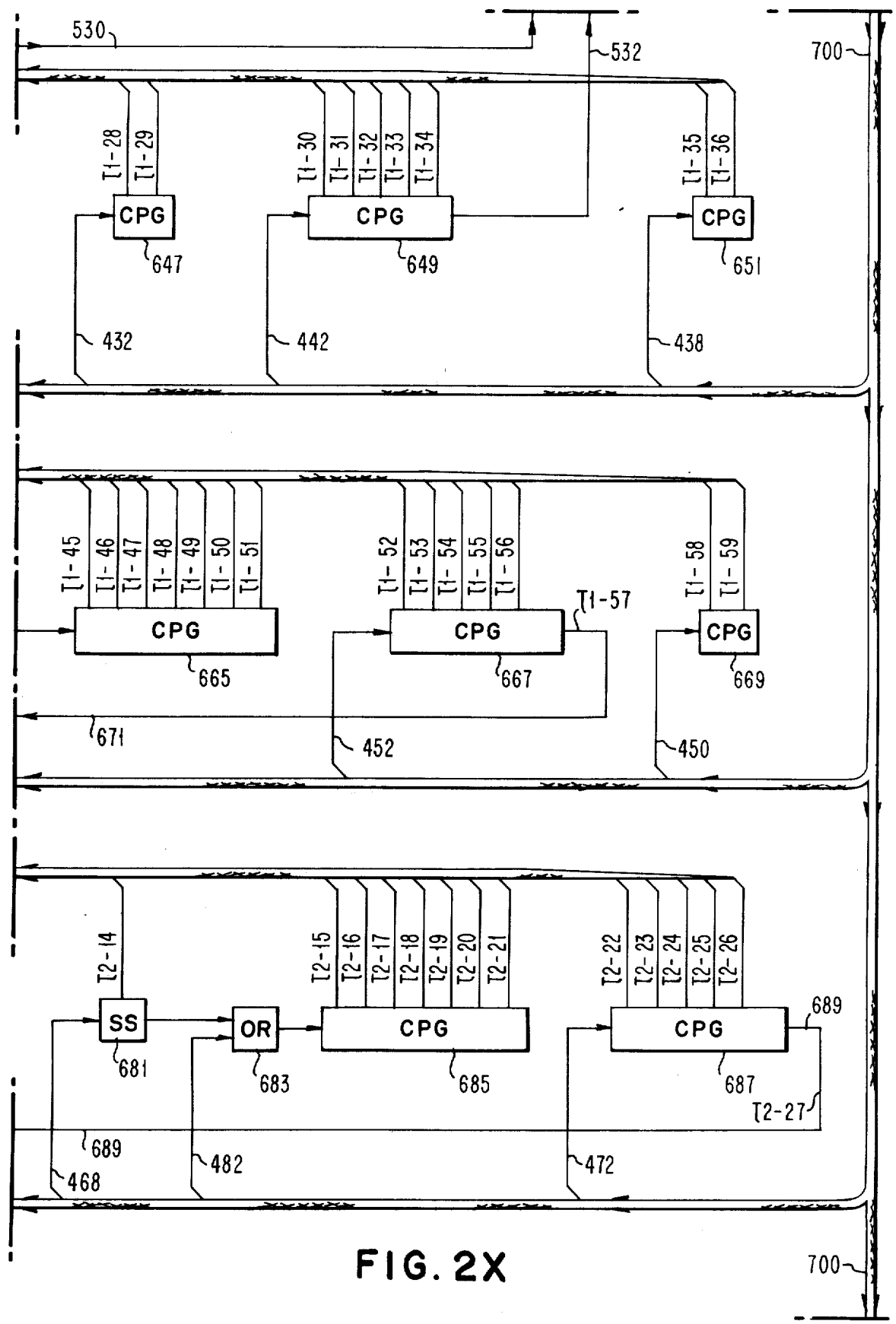
Figure 2Y:
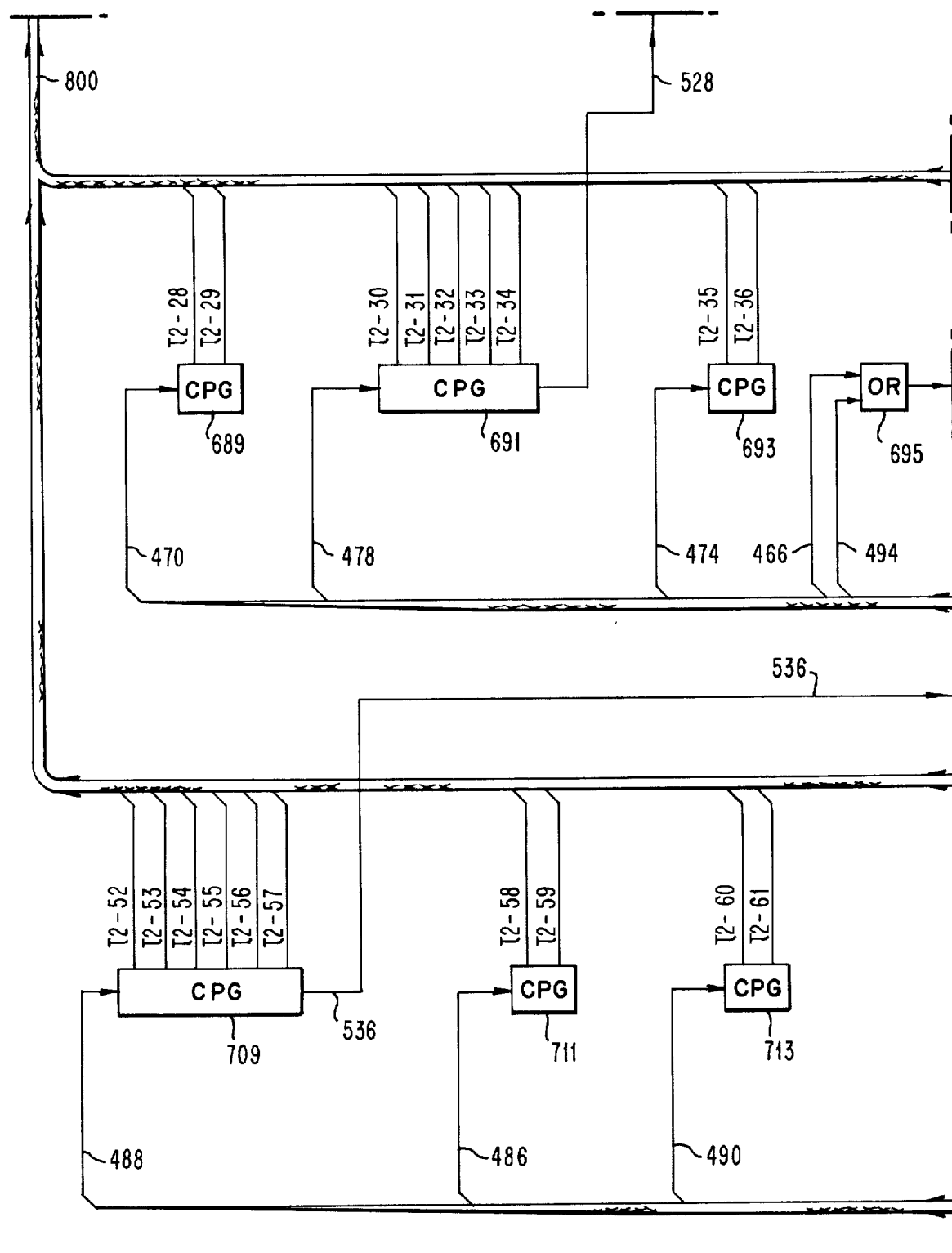

PF-60 operates OR 509 to potentialize line 190 to associate on the valid indicator bit (set at 1) looking for all active programs. PF-61 interrogates the match indicator flip-flops by pulsing line 132 from OR 501. If there are no matches, or if all of the matches have been exploited, the EOL flip-flop 161 will be set to 1 by the chaining through the match indicator flip-flops and associated AND gates. The EOL flip-flop is tested at PF-62 by testing the status of lines 374 (no match) and 376 (match) in gate 359 to potentialize line 378 (no match) or 380 (match). The no match skips to PF-79, while the match line 380 activates PF-63 by activating CPG 595 (FIG. 2V).

PF-63 resets the intermediate flip-flops 130a–n in SAM controls by pulsing line 134 via OR 511, preparatory to finding the topmost "valid" program. PF-64 is connected to OR 503 whose output is wire 196 and to OR 501 whose output is wire 132. This effects a readout from SAM of the topmost valid program under control of the match indicator flip-flop, entering the date listed in the Readings in MDR 173 for that program, including $k^{old}$.

At PF-65, the $k^{old}$ for the program now to be tested is gated from SAM's MDR 173f to comparator register No. 1 (317 FIG. 2L) by opening gate 242' by means of line 242 from OR 435. Comparator register No. 2 (319 FIG. 2L) receives $K + \epsilon$ from adder register 231 via gate 65' and cable 370. Compare circuit 321 now produces a high, low, or equal output.

The equals output 325 from comparator 321 is entered into OR 329 and into OR 331. The output 323 wherein register No. 1 ($k^{old}$) is greater than register No. 2 ($K + \epsilon$) is combined in OR 329 to produce an output on line 382 if $k^{old} \geq k + \epsilon$. The $\overline{382}$ is produced by inverter 333. While not of interest at this time, the third output 327 from comparator 321, wherein register No. 2 is less than register No. 1 is combined in OR 331 to yield 384 if register No. 2 $\geq$ No. 1 will be used later to test the relationship $k^{old} \geq k - \epsilon$.

The lines 382 and $\overline{382}$ are tested in gate 361, opened by PF-66 to potentialize line 386 ($k^{old} \geq K + \epsilon$) or line 388 ($K + \epsilon > k^{old}$). If line 386 is hot, the tau 1 routine is initiated by firing the first single shot in CPG 635 (FIG. 2V). If line 388 is hot, the relationship needs to be tested for $K^{OLD} \geq K - \epsilon$. Line 388 therefore initiates PF-67 and PF-68 in CPG 597 (FIG. 2V). PF-67 gates the result register 241 from subtractor 237 to comparator register No. 2 by opening gate 67'. Register No. 1 still contains $k^{old}$. Wire 384 and $\overline{384}$ are now used to establish the relativity of $k^{old}$ and $K - \epsilon$. If $K - \epsilon \geq k^{old}$, line 384 will be hot. If not, $\overline{384}$ will be hot. These are tested in gate 363 opened by PF-68 to potentialize line 390 from 384 or 392 from $\overline{384}$. Line 390 ($k^{old}$ too small) fires CPG 675 to initiate the tau 2 sequence. If $k^{old}$ is larger than $K - \epsilon$, it having been determined at PF-66 that it was smaller than $K + \epsilon$, then it lies between these limits and the tau for the program now under examination needs no adjustment. Line 392 therefore fires OR 599 to initiate PF-69. Since PF-69 is re-entered from several paths including the tau 1 and tau 2 routines, the continuation of the explanation of the PF timing will be deferred.

The Tau 1 Sequence

It having been determined at PF-66 that $k^{old}$ was greater than $K + \epsilon$, line 386 was potentialized to produce tau 1-1 by activating CPG 635 (FIG. 2V). It will be remembered that at PF-1 time the shift register 265 was initialized with a delta tau value. Since this is a binary shift register, successive shifts of the original entry will produce ½, ¼, ⅛, etc. to permit successive half-value changes plus or minus the tau value for the program. Tau 1-1 gates the K register 275, via cable 268, to the minuend register 235 (FIG. 2H) of the subtractor by opening gate 215 by wire 224 from OR 417. Line 224 also opens gate 221 to gate the $\epsilon$ register 277 to the subtrahend register 239. Result register 241 now contains $K - \epsilon$. This is gated to counter 1 (283 FIG. 2I) by line 228 which opens gate 281, line 228 originating in OR 415 to which tau 1-2 is inputted. To obtain the upper limit, $K - \epsilon$, tau 1-3, via line 230 (from OR 429), gates the K register 275 to the augend register 225 by opening gate 191. The $\epsilon$ register 227 is gated by line 230 to the addend register 229 through gate 201. The sum in register 231 is gated by tau 1-4 to counter No. 2 by line 234 from OR 427. Counter No. 1 now contains $K - \epsilon$ and counter No. 2 has $K + \epsilon$.

At tau 1-5 time, the tau value, read into SAM's MDR at PF-64 time, is gated from the MDR 171 into the augend register 225 of the adder by means of gate 189. The shift register 265 (containing delta tau) is gated to the addend register 229 by means of gate 207 opened by wire 256 from OR 455 (FIG. 2P), having tau 1-5 as an input. The result register 231 is gated to counter No. 3 by means of gate 289 opened by wire 260 which originates with OR 439, having tau 1-6 as an input. Counter No. 3 now contains a new tau value greater than the old tau by delta tau. This is now used to extract a new $k$ value from local memory.

The starting address of the $k$ array, which address resides in MDR 173e of SAM, is gated to the augend register 225 by gate 197, opened via OR 195, wire 236, and OR 425 to which tau 1-7 is inputted. Wire 236 also opens gate 199 to gate the augmented tau value from counter No. 3 to the addend register 229. The sum (new address of $k$) appearing in register 231 is gated to the MAR 167 of local memory at tau 1-8 time by means of gate 233 and wire 240 (from OR 437).

Tau 1-9 applies a read control to local memory to read out the new $k$ value now located in the augmented tau'th column of the $k$ array. Line 206 from OR 421 effects the readout. The value of $k^{new}$ is now to be compared with $k^{old}$ stored in the MDR 173$f$ of SAM. To that end, 1-10 1:10 gates $k^{old}$ from MDR 173$f$ to comparator register No. 1 by opening gate 242' from line 242 (from OR 435). Line 244 (from OR 433) gates $k^{new}$ from MDR 171 of local memory to comparator register No. 2 via gate 244'. The relativity of the two $k$ values is tested at tau 1-11 by examining the status of line 382. Compare circuit 321 produces an output on line 325 if the entries are equal, and an output on line 323 if register No. 1 is greater than register No. 2. OR 329, by combining these two inputs, yields an output on line 382 if register No. 1 is equal to or less than register No. 2. Therefore, if $k^{old} \geq k^{new}$, line 382 will be hot. The inverse condition will potentialize the $\overline{382}$ line. These are tested in gate 381 at tau 1-11 to potentialize line 424 (382) or 426 ($\overline{382}$) respectively. If $k^{old} \geq k^{new}$, the tau 1-12 timing pulse is initiated by connection of line 424 to OR 637 (FIG. 2V) and it to CPG 637'. If line 426 is hot, tau 1-37 is activated by means of OR 653 and CPG 655.

Turning first to the tau 1-12 timing, it now initiates comparison of $k^{new}$ with K − ϵ. To this end, counter NO. 1 (containing K − ϵ, entered at tau 1-2) is gated to comparison register No 1 by means of wire 246 (from OR 423) and gate 246'. The MDR 171 (containing $K^{NEW}$, entered at tau 1-9) is not gated to comparator register No. 2 by wire 244 and gate 244'. Tau 1-13 tests their relativity by again testing lines 382 and $\overline{382}$ as hereinabove described, this time using gate 383 (FIG. 2M) to potentialize line 430 (382) or 432 ($\overline{382}$).

If K − ϵ ≥ $k^{old}$ (430 hot), the tau 1-14 pulse is initiated. If not (432 hot), tau 1-28 becomes active. The former situation will be treated first. Line 430 fires single shot 639 to produce the tau 1-14 pulse which shifts the delta tau value in shift register 265 by one position, thus halving the initial value. The shift line 248 comes from OR 445 energized at tau 1-14 time. Counter No. 3, containing the augmented tau value (entered at tau 1-6), is gated to the minuend register 235 (via gate 211 opened by wire 250 at tau 1-15). The subtrahend register 239 receives the halved delta tau from the shift register 265 means of gate 223 and wire 252 from OR 441. The difference in result register 241 will be used to find a second $k^{new}$ value. Actually, the tau value now to be used is tau + delta tau − ½ delta tau = tau + ½ delta tau.

The latest tau value is gated out of result register 241 into counter NO. 3, using line 258 (hot at tau 1-16) and gate 291. This tau value is gated to the addend register 229 by means of line 236 and gate 199. The augend register is filled from MDR 173$d$ of SAM, containing the starting address of the W$d$ array, by means of line 236 and gate 191. The latest address in sum register 231 is gated to local memory's MAR 167 at tau 1-18 by wire 240 (from OR 437) and gate 233. This provides the address of the latest $k^{new}$, which is read into MDR 171 by a read pulse on line 206, from OR 421 energized at tau 1-19. This is now to be compared with K + ϵ which resides in counter No. 2, where it was entered at tau 1-4.

Tau 1-20 activates OR 519 to potentialize line 208 which opens gate 203' to enter K + ϵ from counter No. 2 into comparison register No. 1. Comparison register No. 2 receives the latest $k^{new}$ from MDR 171 by means of gate 244' opened by line 244 from OR 433.

The question is $k^{new} \geq$ K + ϵ is answered at tau 1-21 by testing wire 384 and $\overline{384}$ in gate 403 to potentialize line 436 if YES and Line 438 if NO. Line 436 initiates tau 1-22; line 438 initiates tau 1-35.

The sequence beginning with tau 1-22 will now look for a new $k$ by adding ¼ delta tau to the tau value just employed. The history of tau in the chain is tau + delta tau − ½ delta tau + ¼ delta tau = tau + ¾ delta tau. The ¼ delta tau is obtained by shifting shift register 265 one position at tau 1-22 by means of shift line 248 from OR 445.

Shift register 265 was initialized at PF-1, and shifted at tau 1-14 and again at tau 1-22 to produce two successive halvings to date or one quarter. Tau as read from SAM was altered by adding delta tau at tau 1-5, subtracting ½ delta tau at tau 1-15, and adding ¼ delta tau at tau 1-23, now to be described.

The shift register 265 (now containing ¼ delta tau) is gated to addend register 229 by means of gate 206 (opened at tau 1-23 from OR 455 and line 256), while counter No. 3 (containing tau as previously amended) is gated to the augend register 225 by wire 254 and gate 187. The sum in register 231 is entered back into counter No. 3 at tau 1-24 through gate 289 and line 260. Counter No. 3 always contains tau with all amendments.

This new tau value is again used to address local memory for a new $k$, by gating the new tau value from counter No. 3 to the addend register 229 by means of wire 236 and gate 199, while the starting address of $k$ in SAM's MDR 173$e$ is gated to the augend register by wire 236 and gate 197 at tau 1-25. The sum in register 231 is now gated to MAR 167 (at tau 1-26 by means of line 240 and gate 233) to provide the address of the latest try at $k^{new}$. This address in conjunction with the read control on line 206 (at tau 1-27) gives the latest $k^{new}$ to the MDR 171 of local memory. Tau 1-27 returns control to tau 1-12 by means of wire 530 and OR 637.

The operation of the sequence beginning with tau 1-12 has been previously explained. However, during that explanation, cognizance was taken of branches at tau 1-13 and tau 1-21, the explanation of which was deferred until later. Returning now to tau 1-12, having come from tau 1-27, it is well to summarize the operation to date.

The tau 1 routine was entered following the test at PF-66 wherein it was found that $k^{old} \geq$ K + ϵ. In the search for a new $k$ value, within the limits of K + ϵ and K − ϵ, the starting address was just incremented by delta tau and the $k$ at that address compared with $k^{old}$. Since $k^{old} \geq k^{new}$, $k^{new}$ was then compared with K − ϵ and found to fall below the lower limit (K − ϵ ≥ $k^{new}$). The address was then decremented by ½ delta tau and a new $k$ value found and compared with K + ϵ and found to be over limit. Tau was next incremented by ¼ delta tau and returned to tau 1-12.

At tau 1-12, counter No. 1 is gated to comparator register No. 1 and MDR 171 of local memory gated to comparator register No. 2. MDR now contains the latest $k^{new}$, as found by the successive half adjustments of tau. At tau 1-13, $k^{new}$ is again compared with $K - \epsilon$ as previously described. If less than $K - \epsilon$, tau 1-14 will follow as previously described. If $k$ is not equal to or less than $K - \epsilon$, then the control branches to tau 1-28 where $k^{new}$ is compared with $K - \epsilon$. The value of $k^{new}$ remains in comparator register No. 2 where it was entered at tau 1-12. The MDR contents are gated to register No. 1 by means of wire 208 from OR 519, having tau 1-28 as an input. Wires 382 and $\overline{382}$ are tested by tau 1-29 in gate 387 to potentialize line 440 or 442, respectively, to manifest the inequality. If $k^{new}$ is less than $K + \epsilon$, the control branches to tau 2-62. If not, control is vested in tau 1-30. This pulse enters counter No. 3 in augend register 225 by means of wire 254 and gate 187, while the shift register is gated to the addend register by means of wire 256 and gate 207. Wire 254 originates in OR 457 and 256 in OR 455, both having tau 1-30 as inputs. It should be noted that the shift register was not shifted. Tau 1-31 gates the adder result to counter No. 3 by means of wire 260 and gate 289. Tau 1-32 gates the starting address of $k$ to the augend register of adder, and the new tau value from register No. 3 to the addend register, using wire 236 to open gates 197 and 199 to effect the entries. The sum (new address) from register 231 is gated to the MAR 167 using wire 240 from OR 437 to which tau 1-33 is connected. Tau 1-34 follows to read the latest $k^{new}$ from local memory 169 into MDR 171 and returns control to tau 1-12, by means of wire 532 and OR 637. These loops will continue to adjust the tau value in counter No. 3 until a $k^{new}$ is found between $K + \epsilon$ and $K - \epsilon$. Control will then return to PF-69.

Another branch that remains to be explained is the one at tau 1-21 wherein if $k^{new}$ is found to be not equal to or greater than $K + \epsilon$ when tested, control skips to tau 1-35. At this time, counter No. 1 containing $K - \epsilon$ is entered in comparison register No. 1 and register No. 2 still contains $k^{new}$, entered at tau 1-20. Entry is effected by means of wire 246 from OR 423. Tau 1-36 tests wires 384 and $\overline{384}$ in gate 389 to potentialize line 444 or 446. Wire 444 ($k^{new} \geq K - \epsilon$) connects to OR 599 to initiate tau 2-62. Wire 446 connects to OR 641 to recycle tau 1-15, et seq.

The final branch operation to which reference has been made occurs at tau 1-11 when $k^{new}$ was compared with $k^{old}$ and found to be not equal or less than equal $k^{old}$. As explained at that time, the NO response potentialized line 426 to initiate tau 1-37. The sequence of timing beginning with tau 1-37 effects a decrease in tau by the amount delta tau, this, following the increase during tau 1-5 to tau 1-9 times, effectively returns the tau value entered in counter No. 3 to its original value as read from SAM.

In detail, tau 1-37 gates counter NO. 3 to the minuend register 235 by means of wire 250 (from OR 443) and gate 211. The shift register 265, containing delta tau as initialized at PF-1 time, is entered in the subtrahend register 239 by means of wire 252 (from OR 441).The difference in result register 241 is entered in counter No. 3 by means of wire 258 (from OR 453 at tau 1-38).

Tau 1-39 gates the starting address from MDR 173$e$ to the augend register 225 (by means of wire 236 and gate 197) and the tau from counter No. 3 to the addend register 229 (by means of wire 236 and gate 199). The sum is gated out at tau 1-40 to the MAR 167 by means of wire 240 and gate 233 and employed at tau 1-41 to address the memory for a readout operation via line 206. The latest $k^{new}$ is gated from the MDR 171 of local memory by means of wire 244 (from OR 433 at tau 1-42) to comparator register No. 2 while counter No. 1 (containing $K - \epsilon$) is gated to comparator register No. 1 by means of wire 246 (from OR 423) and gate 244'. Using wires 382 and $\overline{382}$ the relativity is gated to wires 448 or 450 by means of gate 391 and tau 1-43. If $K - \epsilon \geq k^{new}$, wire 448 is hot to activate tau 1-44. If not, control skips to tau 1-58. The tau 1-58 now begins the test of the relativity of $k^{new}$ and $K + \epsilon$ by gating counter No. 2 to comparison register No. 1, via line 208 and gate 208'. Comparison register No. 2 retains $k^{new}$ from the previous comparison. The relativity is tested at tau 1-59, which pulse opens gate 395 to test lines 382 and $\overline{382}$ to potentialize lines 456 and 458, respectively. Line 456 (hot if $K + \epsilon \geq k^{new}$) activates OR 628 to initiate tau 2-62. Line 458 (inverse) returns control to tau 1-37 via OR 653.

If at tau 1-43 it were found that $K - \epsilon \geq k^{new}$ ($k^{new}$ too small), line 448 would have been hot to initiate tau 1-44, which, via line 248, shifts shift register 265 one position. Counter No. 3 is gated to augend register at tau 1-45 by line 254 (from OR 457) and gate 187, while the shift register is gated to the addend register by wire 256 (from OR 455) and gate 207. The sum is gated from result register 231 to counter No. 3 by line 260 and gate 289 at tau 1-46 time. The starting address of $k$ is read from SAM's MDR at tau 1-47 into the augend register by means of line 236 and gate 197, while the same wire opens gate 199 to enter the new tau value from counter No. 3 into the addend register.

The sum is entered into the MAR 167 of local memory at tau 1-48 by line 240 and gate 233. With this address, the latest $k^{new}$ is read from local memory at tau 1-49 by a read control on line 206. Pulse tau 1-50 (by means of line 208) gates counter No. 2 ($K + \epsilon$) to comparator register No. 1 and (by means of wire 244) gates the MDR 171 to comparator register No. 2. Tau 1-51 tests whether $K^{new} \geq K + \epsilon$, by using wires 384 and $\overline{384}$ and gate 393 to potentialize line 452 (YES) or wire 454 (NO).

Wire 454 initiates tau 1-60 which (by means of wire 246) gates counter No. 1 to comparator register No. 1, $k^{new}$ remaining in register No. 2 from the just performed test. The test at tau 1-61 uses wires 384 and $\overline{384}$ and gate 397 to test if $k^{new} \geq K - \epsilon$. If YES, line 460 is potentialized to activate OR 628 and tau 2-62. If NO, line 462 returns control to tau 1-45 via OR 663.

If in response to the test at tau 1-51 it were found that $k^{new} \geq K + \epsilon$ to potentialize line 452, then tau 1-52 would have been initiated. This shifts the shift register one position (line 248). Tau 1-53 gates counter No. 3 to minuend register (line 250) and shift register 265 to subtrahend register (line 252) of subtractor by opening the respective gates. The difference in register 241 is gated at tau 1-54 (by line 258 and gate 291) to counter No. 3.

Tau 1-55 gates starting address of $k$ from MDR 173$e$ to augend register (by means of line 236) and new tau from counter No. 3 (by means of line 236) to the addend register. The sum is extracted at tau 1-56 (line 240 hot) and entered in the MAR 167 of local memory. Tau 1-57 effects readout, via OR 421 and line 206 to yield a new $k$ value. Tau 1-57 returns control to tau 1-42.

As can be seen from re-examination of the various loops and branches included in the sequences controlled by tau 1-1 to tau 1-61, there were four escapes at tau 1-29, tau 1-36, tau 1-59, and tau 1-62. Each of these escapes resulted from incrementing or decrementing the tau value to derive an address of a new k candidate which was tested twice to determine if it lay between K + ε and K − ε. If NO, the escape was ordered to tau 2-62.

The tau 2 sequence of operations is substantially identical to the tau 1 sequence, except that where in tau 1 the tau value was increased, in tau 2 the value of tau is correspondingly decreased, and vice versa. It will be noted in FIGS. 2O through 2R that many of the OR gates have the same numbered timing pulses from both tau 1 and tau 2, differing in that where one is subtracting delta tau, the other is adding it. Because of the substantial similarity of the two programs, tau 2 will not be explained. The branch, loop, and escape points are identical in both sequences. Tau 2, like tau 1, increases and decreases tau by successive halvings of delta tau until the k value at the resulting address in the k array lies between K + ε and K − ε. The escape points from tau 2 are tau 2-29 (wire 476), tau 2-36 (wire 480), tau 2-59 (wire 492), and tau 2-61 (wire 496). These wires, along with wires 440, 444, 456, and 460 from corresponding exit points in the tau sequence, are all connected as inputs to OR 628 (FIG. 2Z). This OR gate initiates the sequence tau 2-62, tau 2-63, and tau 2-64 to terminate both routines and return control to the page fault sequence at PF-69.

Specifically, tau 2-62 opens gate 177 (FIG. 2F) to gate cable 422 from counter No. 3 to the tau register 173g in SAM's memory data register. The next following tau 2-63 potentializes OR gates 501 and 503 to potentialize lines 132 and 196 which cause a write operation in SAM under control of the topmost match indicator flip-flop. The new tau value is now written into SAM along with the other data in the MDR. Actually, the only data changed is the tau value. The final pulse tau 2-64 is a delay pulse to re-enter the "PF" routine at PF-69 by means of OR 599.

Using this new tau value for that program which occasioned either the tau 1 or tau 2 routine, the sequence of timing pulses beginning with PF-69 now examines all of the pages listed in the associative memory for that program to find page candidates for replacement.

PF-69 controls the following functions:

1. It resets the C bit in the MDR register 147b of the associative memory by a direct pulse.
2. It sets the C bit in write mask 149 of the associative memory to one and resets all other bits in the write mask to zero, thus enabling writing a zero into the C bit position and blocking all other entries.
3. It gates the program I.D. from field 173b of SAM's MDR to argument register 151c of the associative memory by means of cable 394, gate 616 and wire 410 from OR 467 operated by PF-69.
4. It gates the tau field 173g of SAM's MDR to the reference register field 151e of the associative memory's argument register by means of wire 410, gate 620, and cable 356.

PF-70 follows PF-69 and performs the following:

1. Sets the match indicator flip-flops 550 in the associative memory to all ones by means of line 136 from OR 465.
2. Increments reference register portion 151e of the associative memory's argument register by one count by means of line 200 from OR 525.
3. Resets end-of-line flip-flop 159 by means of wire 138 from OR 463.

The associative memory is now prepared to look for pages of this program whose k value is one greater than tau. First, it tests to see if the reference register field of the argument register is all zeros by testing line 334 (from decoder 153) and $\overline{334}$ (from inverter 367) by opening gate 365 with PF-71. If all zeros, line 398 will be potentialized. Non-zeros will render line 396 hot.

If line 398 is hot (all zeros), it will open gate 263 (FIG. 2H) to test the status of flip-flop 128. This flip-flop was reset to zero at PF-1 time when the page fault was initiated and set to one by line 160, from OR 475, at R-1 or RR-1 time. In the instant situation, no candidate for replacement was found and neither R-1 nor RR-1 was entered. Therefore, flip-flop 128 is reset to zero. Line 400 is therefore energized which, on FIG. 2U, fires single shot 611 to produce the PF-78 timing pulse.

However, since the associative memory has not been tested for replacement candidates, the reference register 151e will not be on zero. Therefore, line 396 will be hot to fire single shot 622 to produce the PF-72 pulse. This pulse associates on the program I.D. and the reference register (tau + 1) by potentializing lines 174 and 176 from OR 493 and OR 491, respectively, both active at PF-72. This will leave the match indicator flip-flops 550 set at one for those words matching these criteria.

PF-73 interrogates the match indicator flip-flops by applying a pulse to line 112 from OR 461. PF-74 tests the end-of-line flip-flop 159 for the presence of at least one match (E.O.L. = 0) by testing lines 280 and 282 in gate 369 to potentialize line 402 (no match) or 404 (match).

If no match, line 402 returns control to PF-70 via OR 603. This adds one count to the tau value in the argument register and again interrogates the memory. This loop persists until either the reference register number goes to the limit (all zeros) and branches out at PF-71 or until a match is found.

Assuming that during one of the interrogations a match, or matches, is found, at PF-74 line 404 will be potentialized to fire CPG 609 to initiate PF-75 to PF-77. PF-75 resets the flip-flops 110 in associative memory controls 200 by potentializing line 178 via OR 489. PF-76 now energizes write line 158 and wire 112 to effect a writing operation into the topmost matching word. The C = 0, set into the MDR 147b at PF-69 will be passed by the write mask to be entered in the first matching word. This page is now marked as a candidate for replacement. PF-76 achieved this by means of OR 477 and OR 461.

PF-77 resets the topmost match indicator flip-flop in the associative memory via line 192 from OR 507 and returns to PF-73 looking for further matches and marking any so found. This loop recycles until all matches have been found and marked with zeros in the C bit position. When all matches have been thus exploited and at PF-74 time a no-match is registered to potentialize line 402, PF-70 is re-initiated. This, as explained, increments the tau value in the argument register, still maintaining the same program I.D. It now searches for the next echelon of program pages whose reference number equals the augmented tau value and marks all those pages. It will be remembered that the higher reference register numbers manifest the more remote access. Finally, when the page loop PF-73 to PF-77 has been recycled for each page matching a given tau value and the incrementing loop PF-70 to PF-74 has recycled until tau reaches the limit, PF-71 will find the decoder 153 to register all zeros.

Control now goes to PF-78 via line 400. This pulse (via line 194) resets the topmost match indicator flip-flop in SAM and returns control to PF-61 by means of a wired connection to OR 591. SAM was previously interrogated on the valid indicator bit. The topmost program was examined to determine if its tau needed adjustment. If so, the tau 1 or tau 2 routine was initiated to compute a new tau. The second program is now subjected to the same test and adjustment if necessary. This time it will be assumed that the tau value for the next-found program produces a $k$ value which lies between $K + \epsilon$ and $K - \epsilon$ and thus needs no adjustment. Therefore, when so listed at PF-66 and PF-68 and found to satisfy the relativity, control returns immediately to PF-69 for marking all eligible page candidates for replacement as hereinabove explained. Each valid program in SAM is in turn tested for its tau value, adjusted if necessary, and then interrogated in the associative memory for replacement eligibility.

Finally, when there are no more programs left to be operated on in SAM and SAM's end-of-line flip-flop 161 is tested at PF-62, by means of gate 359, to potentialize line 378 (no more matches), this line fires CPG 615 (from OR 613) to produce PF-79.

Up to now, all candidates for replacement have been marked using the tau value for each respective program. Conceivably, this may have yielded no candidates. Therefore, the timing steps now to be explored will decrement the tau values of all valid programs in SAM and new candidates sought. This decrementing will continue until a candidate is found.

Therefore, at PF-79, the following happens:
1. Line 264, from OR 449, resets the C bit in argument register 151b to zero.
2. Sets match indicator flip-flops 550 to one by means of OR 465 via line 136.
3. Resets end-of-line flip-flops 159 to zero, via line 138 from OR 463.

PF-80 follows to associate on C bit (zero) by means of line 218 from OR 517. PF-81 interrogates the match indicator flip-flops 550 to set or not set end-of-line flip-flop 159 by potentializing line 112. PF-82 lists the flip-flop in gate 371 to potentialize line 406 (no match) or 408 (match).

If no match, line 406 will fire CPG 617 to yield PF-83 and 84. PF-83 decrements the tau register portion of all words in SAM, these bit positions being connected as a reversible binary counter. PF-84 associates on the valid indicator bit (set at PF-59 and never reset) in SAM. PF-85 follows to potentialize the match interrogation line 132 in SAM. PF-86 tests for matches by interrogating the state of EOL flip-flop 161 in gate 373 to potentialize line 410 (no match) or 412 (match).

Assuming a match condition, line 412 initiates PF-87 which resets the intermediate flip-flops in the SAM controls, via line 134.

SAM is read at PF-88 by means of lines 132 and 196 under control of the match indicators to deliver the topmost decremented tau value to MDR 173g of SAM.

PF-89 follows to achieve the following:
1. It gates the program I.D. from MDR 173b of SAM to argument register 151c of the associative memory, using wire 410 and gate 616.

2. It gates the tau field 173g from SAM's MDR to associative memory argument register 151e, using wire 410 and gate 620.

3. It sets associative memory match indicators to 1, using line 136.

The C bit in the associative memory MDR is still reset to zero, and the mask bits remain as set at PF-69.

PF-90 increments reference register 151e by one count, by potentializing line 200, and resets EOL flip-flop 159 to 0 by means of wire 138. As before, the reference register portion 151e is tested for zeros by means of decoder 153 and gate 375 to see if interrogation of any given program is complete. All zeros potentialize line 414 to initiate PF-98. Not all zeros potentialize line 412 to initiate PF-92.

PF-92 associates on program I.D. and reference register number in the associative memory by potentializing lines 174 and 176. The following pulse at PF-93 interrogates the match indicator flip-flops 550a–n by potentializing line 112 at this time, by means of OR 461. This sets end-of-line flip-flop 159 if there are no matches, the state of which is tested at PF-94 by means of gate 379 to potentialize line 416 (no match) or line 418 (match).

Line 416 (no match) returns control to PF-90 where the tau value in the reference register portions of the associative memory are incremented by another count, still seeking candidates for replacement. This continues until a candidate (or candidates) is found and marked. Finally, after sufficient incrementing of the tau value, a match must be found to satisfy the test at PF-94 to yield control to PF-95.

PF-95 resets the flip-flops 110 in the associative memory controls by pusling line 178, from OR 489. PF-96 follows to effect the readout of the matching word under control of the match indicators by means of lines 158 and 112 both of which are pulsed at this time from OR 477 and OR 461, respectively. The matching entry is now in the MDR of the associative memory.

PF-97 resets the topmost match indicator in the associative memory controls by means of OR 597 and line 192. The topmost match indicator in SAM is reset at PF-98 by wire 194 from OR 505.

Upon termination of PF-98, control returns to PF-85 by means of wire 538 and OR 619. This movement returns to determine if all of the valid programs in the small associative memory have had their tau values tested, and the page components thereof marked for replacement. Since the PF-85 and PF-86 sequence has previously been described, the description need not be repeated. It is now assumed that there have been sufficient repeats to satisfy all match conditions for the valid programs in SAM so that at PF-86 when SAM's end-of-line flip-flop 159 is tested for a match, and there is none, line 410 will be hot to return control to PF-79.

PF-79 resets the C bit to zero in argument register 151b of the associative memory by means of line 264 from OR 449. The associative memory match indicator flip-flops 550a–n are set to one by pulsing line 136 from OR 465, and the end-of-line flip-flop 159 in the associative memory is reset to zero by line 138 from OR 463. This is preparing the associative memory to be interrogated for pages having a C marker bit equal to zero. Since the tau 1 or tau 2 routines computed new tau values for each program and PF-69 et seq. sequences marked the candidates, there will now be one or more candidates marked with a C=0 bit.

Therefore, PF-80 associates on the C bit by applying a potential to line 218 which originates with OR 517. For the reasons stated, this will now yield one or more matches so that at PF-81, when the match indicator flip-flops 550a–n are interrogated by means of line 112, the end-of-line flip-flop 159 will remain reset to zero.

The test of the end-of-line flip-flop at PF-82 will signal a match on line 408 which, on FIG. 2S, activates OR 547 to initiate RR-1 and the read and replace routine heretofore described. This routine moves the pointer bit in the associative memory controls to the next page having a C bit equal to zero. The last-used pointer was stored in one of the flip-flops 554a to 554n in the associative memory controls (FIG. 2A).

The RR-1 proceeds as heretofore described to rewrite the pointed-to page in the backup store and replace that page with the sought page which caused the page fault in the first instance. During this sequence of operations, the modulo 1024 counter is incremented (specifically at RR-4). This could increment the counter to all zeros, causing an incrementing of all the reference register numbers for the non-accessed pages in the associative memory. So that this latest count update can be exploited, control returns to PF-9 following RR-7, in addition to continuing on to RR-8, RR-9, and RR-10, which signals the CPU to effect readout of the now replaced word in working memory.

The PF-9 pulse reinitiates the tau routines as heretofore described and makes adjustments, if necessary, to the $k$ and tau values of each program. At PF-71 time, the page fault routine is terminated. Specifically at PF-71, the following occurs:

1. Reference register portion 151e of the associative memory argument register is tested for zeros. It will now be all zeros to potentialize line 398.
2. Line 398 opens gate 263 to gate the set and reset outputs of flip-flop 128 to lines 261 and 400, respectively.
3. Flip-flop 128 was set to one at RR-1. Therefore, line 261 will be hot to reset page fault flip-flop 259 (FIG. 2H) to zero. There is no further output from this circuit to any further timing pulse. All cycles therefore terminate.

It is to be noted that if at PF-4 or PF-8 a marked candidate for replacement had been found, control would have been diverted to R-1 or RR-1, respectively. This would still have returned control to PF-9 and the sequence of controls following, including all branches to PF-71 where the routine would have been terminated. Thus, PF-71 will terminate all operations of the page fault routine.

The foregoing detailed description, taken in conjunction with the summary, functional flow chart of FIG. 1 shows how each page fault occasions the computation of a new K based on the lastest statistics. This K value is then used as a norm to adjust the tau values of all programs and to mark the respective pages as candidates for replacement. This dynamic readjustment of the replacement criteria optimizes the allocation of memory among the programs competing therefor.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. In a data procesing system having a working memory and a backup store, in which a plurality of different classes of information, each consisting of a plurality of blocks, are all stored in the backup store, and a lesser number of blocks of each class are stored in the working memory through which all accesses are effected, means for allocating space in said memory among the plurality of classes competing for space therein in accordance with the relativity of stored block and class weighting criteria and an overall weighting norm, all of which are periodically updated as a function of the history of accesses to said working memory comprising;
    sequencing means operative to provide a succession of signals for controlling the sequencing of the operation of a plurality of instrumentalities;
    means responsive to the accessing of said working memory and operative under control of said sequencing means to derive and store for each block in working memory a reference number, the magnitude of which manifests the number of memory accesses since each respective block was last accessed;
    means responsive to the failure to find a sought block in said working memory and operative under control of said sequencing means to derive and store a set of weighting parameters for that class to which the missing block belongs, the said set being a predetermined function of the reference numbers of the blocks belonging to that class;
    means under control of said sequencing means, following completion of the derivation and storage of the class weighting parameters, to extract from storage the prior computed overall norm weighting value, the prior computed class weighting criteria, and the number of classes in said working storage, and computing and storing as a predetermined function of these and said set of weighting parameters for the class, an updated overall weighting norm;
    means under control of said sequencing means for comparing said overall norm weighting value with each set of stored class weighting parameters, and selecting the value most nearly equal to said norm and choosing as a numerical designator for each class the ordinal position in the set of the thus-selected value, and storing the selected value and numerical designator as weighting criteria for each class; and
    means under control of said sequencing means for comparing the numerical designator for each class with the reference value of all blocks of the corresponding class and marking those blocks for replacement whose reference number exceeds the corresponding designator value.

2. The apparatus of claim 1 wherein the means for deriving and storing a reference number for each block in working memory comprises:
    an acces counter, having a capacity of $\Delta$ counts, operative responsive to each memory access to increment its count by one, and to produce a signal upon the accumulation of every $\Delta$ counts;
    a reference value register for each block of information stored in said working memory;
    means operative responsive to the accessing of a block of information in memory for resetting the reference register for that block to which access is made;

means responsive to said signal for incrementing the reference registers of all non-accessed blocks by one count;

whereby a low reference register value manifests a recent access to a block and a higher reference number manifests a more remote access.

3. The apparatus of claim 1 wherein the means for deriving an updated set of weighting parameters for that class to which the missing block belongs comprises:

means for counting the number of blocks belonging to the clas to which the missing block belongs whose reference register values equal each of the cardinal values from 0 to X and storing the block count in the corresponding ordinal position of a first table of values having X+1 entries;

means for obtaining the difference of each successive pair of entries in said first table of values and storing the differences in a second table of X entries;

means for obtaining the quotients of each entry in said second table and divided by a corresponding ordinal entry in said first table and storing the negative of said quotients in a third table of X entries; and means for selecting one of said entries in said third table for use in computing said overall norm weighting value, said means for selecting comprising means for retrieving from storage the last-derived set of weighting parameters for the selected class a numerical tau value for that class, and means under control of this value for selecting and storing the ordinal entry in said third table corresponding to the cardinal value of tau, wherein tau equals the cardinal value of the ordinal position in said third table whose value most nearly equals the overall weighting norm.

4. In a data processing system having a working memory and a backup store, in which a plurality of different classes of information, each consisting of a plurality of blocks, are all stored in said backup store, and a lesser number of blocks of each class are stored in the working memory through which all accesses are effected, means for allocating space in said memory among the plurality of classes competing for space therein in accordance with the relatively of a stored set of class weighting parameters to a stored overall norm weighting value, all of which are periodically updated as a function of the history of access to said memory, comprising:

means for storing the last-derived set of weighting parameters for each class of information resident in said memory;

means for storing the last-derived overall norm weighting value $K^{OLD}$;

a counter, having a capacity of $\Delta$ counts, and operative to count every access to said working memory;

means for storing a reference value for each block of information stored in said memory;

means for restoring the reference value to zero for that block to which access is sought in working memory;

means under control of said counter for incrementing the reference values of all non-accessed blocks by one count when said counter achieves its maximum of $\Delta$ counts;

means operative responsive to the failure to find a sought block in working memory for computing and storing a new set of weighting parameters for that class to which the missing block belongs, said means comprising;

means for counting the number of blocks of that class having a reference value equal to each of 0 to X successive cardinal values and storing the counts as a first table of values of X+1 entries, wherein each W$d$ entry in the table equals the count of the number of blocks having a reference register value equal to each of the respective numbers 0 to X;

means for obtaining the difference of each successive pair of W$d$ entries in said first table and storing said differences as a second table of values of X entries, wherein each W$dd$ entry in the table equals the difference;

means for obtaining the quotient of pairs of W$dd$ and W$d$ values taken from said second and said first tables by successively dividing each W$dd$ entry from said second table by a corresponding W$d$ entry from said first table and storing each quotient with a negative sign in a third table of values of x entries, wherein each entry represents a succession of $k$ values for the faulting class and comprises the stored weighting parameters for that class wherein each $k$ entry in the table equals the negative quotient of a W$dd$ entry from said second table divided by a W$d$ value from a corresponding ordinal position in said first table;

means for retrieving from said last-derived set of stored weighting parameters for this class a tau value, wherein tau has a value ranging from 0 to X;

means under control of said tau value for selecting that $k$ value from said third table occupying the tau'th entry position and storing this $k$ value as a further weighting parameter for this class;

means for computing and storing an overall weighting value K in accordance with the following relationship $$K^{NEW} = K^{OLD} + (k^{new} - k^{old}/n)$$

wherein $K^{OLD}$ is obtained from the stored norm weighting value obtained from the previous computation thereof, $k^{new}$ is the value just seleted in the tau'th column of the third table, and $k^{old}$ is retrieved from the stored set of weighting parameters from the prior derivation, and $n$ is the number of classes of information;

means for retrieving from storage the third ($k$) table for each different class of information and for searching the entries therein for a $k$ value which satisfies the relationship $K + \epsilon > k > K - \epsilon$, where $\epsilon$ is a predetermined constant, and K is the just-derived weighting norm;

means for converting the ordinal position of each respective thus-found $k$ value for each class to a corresponding tau value for each class and storing each of said values as one parameter of said set of weighting parameters;

and means for comparing each respective tau value for each class with the reference values of each block of the corresponding class and marking those blocks as candidates for replacement whose reference value exceeds the corresponding class tau value; whereby the third, or $k$, table for the class having the missing sought block is updated and stored, the overall weighting norm K is updated as a function of the change in the $k$ parameters of this class, and the tau values of the non-accessed classes are updated as a function of the weighting norm K, so that all classes have an updated set of stored weighting parameters.

* * * * *